(12) United States Patent
Nickerson et al.

(10) Patent No.: US 12,197,546 B2
(45) Date of Patent: Jan. 14, 2025

(54) DATA MODEL TO ORGANIZE, GENERATE, AND SHARE DATA ABOUT AN OBJECT WITH MULTIPLE MEDIA FORMATS VIA VARIOUS PRESENTATION SYSTEMS

(71) Applicant: Artifcts, Inc., Gainesville, VA (US)

(72) Inventors: Heather Nickerson, Gainesville, VA (US); Ellen Goodwin, Gainesville, VA (US)

(73) Assignee: Artifcts, Inc., Gainesville, VA (US)

( * ) Notice: Subject to any disclaimer, the term of this patent is extended or adjusted under 35 U.S.C. 154(b) by 215 days.

(21) Appl. No.: 17/738,977

(22) Filed: May 6, 2022

(65) Prior Publication Data
US 2023/0359708 A1  Nov. 9, 2023

(51) Int. Cl.
| | | |
|---|---|---|
| G06F 21/10 | (2013.01) | |
| G06K 7/14 | (2006.01) | |
| G06T 17/00 | (2006.01) | |
| G06T 19/00 | (2011.01) | |
| G06V 10/74 | (2022.01) | |

(52) U.S. Cl.
CPC .......... *G06F 21/10* (2013.01); *G06K 7/1417* (2013.01); *G06T 17/00* (2013.01); *G06T 19/006* (2013.01); *G06V 10/761* (2022.01); *G06F 21/1011* (2023.08); *G06T 2219/004* (2013.01)

(58) Field of Classification Search
CPC ....... G06F 21/10; G06V 10/761; G06T 17/00; G06T 19/006; G06T 2219/004

USPC ......................................................... 345/419
See application file for complete search history.

(56) References Cited

U.S. PATENT DOCUMENTS

| | | | |
|---|---|---|---|
| 11,430,198 B1 * | 8/2022 | Dunn | G06T 7/73 |
| 2018/0101810 A1 * | 4/2018 | Feng | G06Q 10/1097 |
| 2018/0205926 A1 * | 7/2018 | Mogalapalli | H04N 13/128 |

OTHER PUBLICATIONS

Non-Final Office Action for related U.S. Appl. No. 17/885,092 issued on Dec. 20, 2022, pp. 1 to 9.

* cited by examiner

*Primary Examiner* — Thomas J Lett
(74) *Attorney, Agent, or Firm* — Pillsbury Winthrop Shaw Pittman LLP

(57) ABSTRACT

Provided is a method including: associating a virtual display of an object with first media content including a first type media content; associating the virtual display of the object with second media content that includes second type media content; generating a data model that includes the virtual display associated with the first media content and the second media content; and storing the data model in a storage device coupled to the computer system. As such, the method unifies all components (e.g., media content, tags, permissions, descriptions) of the data model—text description and attributes, image, video, and audio—to create a unique, multi-dimensional, transferable digital representation of an idea, memory, or history tied to the object.

20 Claims, 9 Drawing Sheets

DATA MODEL TO ORGANIZE, GENERATE, AND SHARE DATA ABOUT AN OBJECT WITH MULTIPLE MEDIA FORMATS VIA VARIOUS PRESENTATION SYSTEMS

BACKGROUND

1. Field

The present disclosure relates generally to computer-implemented system and method for a data model to organize, generate, and share data about an object using multiple media formats and via multiple presentation.

2. Description of the Related Art

Computing devices may be used for a wide variety of purposes. Computing devices, for example, may be used interact with other users, access media content, share media content, and create media content. The media content can include text, images, videos, or audio. In some cases, media content can be provided by members of a social network. The media content may be published to the social network for consumption by others.

Furthermore, augmented reality enhances the physical world by creating virtual annotations to augment one's perception of reality. It has found applications in various areas, such as training, communication, entertainment, education, driving-safety, and healthcare. As a result, in recent advances of augmented reality devices and development of augmented reality applications for use with personal devices such as mobile phones and tablet computing devices, as well as development of communication technologies (e.g., 5G and 802.11ac/ad), augmented reality applications will likely become ubiquitous and be widely adopted by consumers and businesses. As such, augmented reality will likely become ubiquitous in social network settings.

SUMMARY

The following is a non-exhaustive listing of some aspects of the present techniques. These and other aspects are described in the following disclosure.

Some aspects include a method including associating a first virtual display of a first object with first media content including a first type media content; associating the first virtual display of the object with second media content that includes second type media content; generating a first data model that includes the first virtual display associated with the first media content and the second media content; and storing the first data model in a storage device coupled to the computer system. The method unifies all components (e.g., media content, tags, permissions, descriptions) of the data model, also called an Artifct, —text description and attributes, image, video, and audio—to create a unique, multi-dimensional, transferable digital representation of an idea, memory, or history tied to the object.

Some aspects include a tangible, non-transitory, machine-readable medium storing instructions that when executed by a data processing apparatus cause the data processing apparatus to perform operations including the above-mentioned process.

Some aspects include a system, including: one or more processors; and memory storing instructions that when executed by the processors cause the processors to effectuate operations of the above-mentioned process.

BRIEF DESCRIPTION OF THE DRAWINGS

The above-mentioned aspects and other aspects of the present techniques will be better understood when the present application is read in view of the following figures in which like numbers indicate similar or identical elements.

Figure 1:
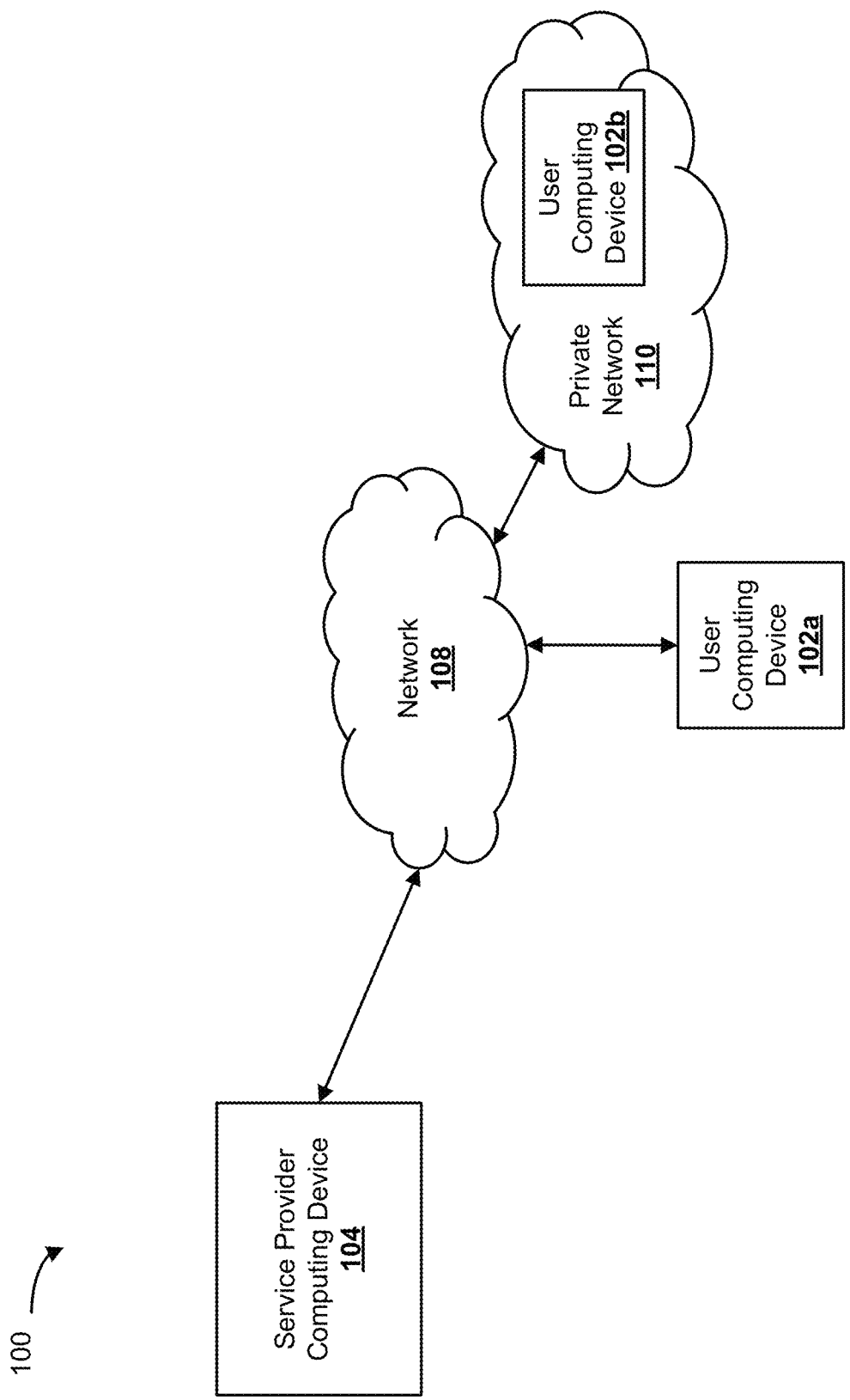
FIG. 1 is a block diagram illustrating an example of a data modeling system, in accordance with some embodiments of the present disclosure.

While the present techniques are susceptible to various modifications and alternative forms, specific embodiments thereof are shown by way of example in the drawings and will herein be described in detail. The drawings may not be to scale. It should be understood, however, that the drawings and detailed description thereto are not intended to limit the present techniques to the particular form disclosed, but to the contrary, the intention is to cover all modifications, equivalents, and alternatives falling within the spirit and scope of the present techniques as defined by the appended claims.

DETAILED DESCRIPTION OF CERTAIN EMBODIMENTS

To mitigate the problems described herein, the inventors had to both invent solutions and, in some cases just as importantly, recognize problems overlooked (or not yet foreseen) by others in the fields of digital content-creation tooling, data compression, augmented reality, machine learning, and computer science. Indeed, the inventors wish to emphasize the difficulty of recognizing those problems that are nascent and will become much more apparent in the future should trends in industry continue as the inventors expect. Further, because multiple problems are addressed, it should be understood that some embodiments are problem-specific, and not all embodiments address every problem with traditional systems described herein or provide every benefit described herein. That said, improvements that solve various permutations of these problems are described below.

Humans naturally accumulate and collect objects through life, but fail to reliably capture and share the meaning, history, or stories behind the objects, rendering those histories forgotten, the objects of less interest to future generations, and ultimately decreasing the potential resale value when the story is divorced from the object.

Current consumer solutions are limited and chaotic in terms of how they capture, convey, and carry forward the meaning behind objects in our lives. For example, some solutions are professional oriented and only provide storage of specific digital files and do not unify those files into a complete profile about an object. The burden remains on the user to make sense of all the stored files. Other solutions prompt users to tell bits of stories—implying you have stories and are able and willing to record them—and yields a physical, non-editable, non-dynamic book. Individuals sometimes resort to making lists in a document or spreadsheet or physical notes in wills, notebooks, or sticky notes on objects. All of these are difficult to track and typically poorly maintained as well as leaving authenticity of information to question.

The systems and methods disclose data models, also referred to herein as an Artifct, that unify all components (e.g., media content, tags, permissions, descriptions) of the data model—text description and attributes, image, video, and audio—to create a unique, transferable digital representation of an idea, memory, or history tied to the object. In various embodiments, audio, video or other media content tokening for viewing privileges is attached to individual permissions for access to each data model as specified by the data model owner. In various embodiments, the data model may be available via a web browser application or a native application that provides a user interface is that is relatively simple and requires few details to initially generate a data model. For example, required ("short" form) details are non-technical to appeal to a general user instead of only museum curation and appraisal professionals. In various embodiments, the user interface may include free form and list select. The "full" form details include typical fields that would appeal to specialists. In some embodiments, the user interface may provide custom field options for enterprise clients who may have specialized input requirements for legal or professional reasons.

Each data model or Artifct is private by default to empower each user to choose which if any data models to share or to make public. Some aspects of each data model—documentation, value, and location—may not be shared publicly, even if the data mode is public, and only on a limited basis when shared to individual users. In various embodiments, the permissioning system is by a screen name, an email, a handle, or other use identifier, and offers a plurality of levels (e.g., view only, edit, or full control (same permissions as data model owner)). Users may select to always grant "view" access to a specific user (or many) to skip sharing each new data model with that user. Once a data model is created, the owner (as well as anyone given "edit" or "full control" access) can print a QR code to feature with or attach to a physical object on which the data model is based so that as other users come upon the physical object, those users may scan the QR code and learn the story behind the physical object associated with the data model by directing that user to the data model that is associated with the QR code. If the data model is private, the person who scanned the QR code will hit a security wall and have the option to "Request Access" to the data model. The owner can choose to disregard or grant access. Data models may also be shared into social media if the data models are public. This option may be deactivated if the data model is private.

In various embodiments, data models may be viewed in a list format, a tile format, a flipbook format or other formats on a web browser application version. A mobile, native application version may open each data model in tile format to fit a mobile computing device. As such, the system includes autoformatting logic to format the data model or a set of data models to the size screen included on the user computing device that is being used with the data model. The featured image ("cover"), also referred to herein as a virtual display, for each data model is chosen (and changeable) by the user. Media content may be presented in various formats. For example, video files, audio files, photo files, or other media content may be presented as thumbnails. When a user selects media content, they have the option perform media controls to the media content (e.g., expand the visual, play media content, pause media content, rewind or fast forward media content, or other media controls).

The systems and methods of the present disclosure may support data model discovery by the search engine, and covers all attributes of the input form, as well as sorting by a custom "category" taxonomy structure, recent/oldest sorting, and relevancy score. An advance search menu also shows a user's recent search terms and data models most recently viewed by that user. In various embodiments, the data models may include searchable tags. The searchable tags allow for unique indexing such that the tag becomes part of the data model (e.g., Artifct) as well as a way for a user to search for Artifcts. The tags may be navigable such that a user may navigate through Artifcts based on common tags. As such, through an Artifct, stories may be captured and preserved. In contrast to conventional systems of simply knowing a genealogy or capturing pictures and videos without context, the embodiments of the present disclosure extend to any object that preserves the meaning of that object to an owner or series of owners by storing memories/stories through the Artifcts. With tagging and search, these memories are searchable.

In various embodiments, the system creates a data model by combining the various media content and the virtual display of the object into the single data model. The data models are exportable: XLS, CSV, PDF, and ZIP (XLS+all documentation, photo, video, and audio files in original formats (e.g., AAC, AC3, AVI, HEIC, JPG, MKV, MOV, MP3, MP4, M4V, M4A, OGG, PNG, WEBM, WAV, WMA, WMV, or any other format that would be apparent to one of skill in the art in possession of the present disclosure)). Users are prompted to export their data model should the user cancel a subscription. The PDF option includes the date of last edit, and by whom, in the document footer. In some embodiments, users may assign a legacy contact. The contact is notified the content has been selected as such and may in the future request control of the assignee's data models after providing legal proof the original owner is deceased or otherwise incapacitated. In various embodiments, data models may be imported or exported in bulk such that multiple data models may be transferred or downloaded in a single transaction. In other embodiments, the media content included in those data models may be drawn from storage to create new data models or augment other data models.

In various embodiments, users may follow others to receive notifications when a user posts a new data model publicly or with specific access granted to them. In some embodiments, a user may pin data models for easy access in the future instead of searching for them.

In some embodiments, user may publish alerts/reminders for individuals based on their unique data models and modeling history to encourage usage and full use of all platform features, including Artifcting details, collaboration options, as well as security features.

In various embodiments, an administrator, via a backend administrator interface, may modify the data modeling system to include a maximum individual file sizes and collective file size of each data model. The administrator may also modify how many media content files are attached to the image view area and in the documentation support area of each data model. Based on the backend administrator interface, an administrator may also change permissions for a plurality of subscription levels such to provide subscribers with a better match subscription fit requirements as the system usage increases. An administrator, via the backend administrator interface, may also turn any specific data model to private mode if it violates a community policy or terms of use or reassign the data mode (e.g., to the legacy contact).

In various embodiments, machine learning may be integrated into the Artifcts platform to support multiple purposes. For example, machine learning may support content moderation. A machine learning engine may be used to detect and proactively flag content that potentially contradicts a community policy or some other media content condition. As such, unique content requirements mean that weapons, sensational art, and other content may be posted without violating platform policies, and thus eliminating the need for sophisticated multi-tenant approaches to manage warning and response.

Furthermore, the machine learning engine may support 'About' information. Users often are in possession of objects without knowing much if anything about the origins of the objects, what they are made of, what the symbols, icons, or other markings mean, and the like. The machine learning model may assist and reveal potential details from internet-based sources and libraries, including appraisal sources, marketplace and auction listings, media outlets, and more and the user can choose what to do with that information (ignore, add to the data model, or other action, and the like). The about information can also be applied to suggest to the user appropriate data model categories and tags as well as to help them sort and stack data models into custom categories.

In various embodiments, machine learning may support, community development and engagement. In various embodiments, the machine learning engine may be paired with metadata and media documentation of each data model, which will allow the data modeling system to suggest other content (e.g., data models, media content, or other content) and users in the data modeling system to pin/follow and build connection through shared interests.

In various embodiments, the data modeling system may include an augmented reality engine or the virtual reality engine. When generating the virtual display of an object, digital impression modeling may assist with virtual reality applications for users to recreate travel or home-based experiences, or for museums and auction houses to transport people into the origins of the data model in their context. The augmented reality engine or the virtual reality engine may allow a user to view their own data model, view data models shared with the user, or that are public. The augmented reality engine or virtual reality engine may also offer the opportunity to "touch up" old and poor-quality photos/images included with each data model to enhance their details.

In various embodiments, a natural language engine may be integrated into the data modeling system and may allow for prompting community members for additional information about their Artifcts. Where did you get the Artifct? Who gave it to you? There may even be automated free text guide users can enable ("inspire me") within the data model form to prompt users with the beginning of a story ("I remember when I got this {object name}, it was [fill in the blank] and I was with [fill in the blank].) Users could complete or skip specific prompts to help add details/fill in the blanks in the description field of their data model. The natural language engine may also encourage them to share with others to add additional details that they may not remember or know.

In various embodiments, the data models may be transferable. For example, data models may advertise for resell and upcycling. For data models that an owner wishes to sell or donate—whether that's the original data model owner or someone who inherits data model—the data modeling system may support a resell/upcycling marketplace feature that allows sales and transfers of the data models. In some embodiments, non-fungible tokens (NFT) may be created to transform a data model into an NFT and sell that NFT. The system may allow users to transform a data model into an NFT and sell and reassign the data model rights. In some embodiments, the NFT itself or other virtual objects may become a data model. In various embodiments, an NFT wallet may be created with the history/stories that go with it from a user's perspective (e.g., Why I bought the NFT, the documentation on its value and provenance, etc.). These and other embodiments, that provide technical improvements to content management, augmented reality, virtual reality, or machine learning are discussed in further detail below.

FIG. 1 depicts a block diagram of an example of a data modeling system 100 (e.g., an Artifcting system), consistent with some embodiments. In some embodiments, the data modeling system 100 may include one or more user computing devices (e.g., a user computing device 102a and a user computing device 102b) and a service provider computing device 104. The user computing devices 102a and 102b and the service provider computing device 104 may be in communication with each other over a network 108. In various embodiments, the user computing device 102a may be associated with a first user and the user computing device 102b may be associated with a second user (e.g., in memory of the data modeling system 100 in virtue of user profiles). These various components may be implemented with computing devices like that shown in FIG. 9.

In some embodiments, the user computing devices 102a and 102b may be implemented using various combinations of hardware or software configured for wired or wireless communication over the network 108. For example, the user computing devices 102a and 102b may be implemented as a wireless telephone (e.g., smart phone), a tablet, a personal digital assistant (PDA), a notebook computer, a personal computer, a connected set-top box (STB) such as provided by cable or satellite content providers, or a video game system console, a head-mounted display (HMD), a watch, an eyeglass projection screen, an autonomous/semi-autonomous device, a vehicle, a user badge, an augmented/virtual reality device, or other user computing devices. In some embodiments, the user computing devices 102a and 102b may include various combinations of hardware or software having one or more processors and capable of reading instructions stored on a tangible non-transitory machine-readable medium for execution by the one or more processors. Consistent with some embodiments, the user computing devices 102a and 102b include a machine-readable medium, such as a memory that includes instructions for execution by one or more processors for causing the user computing devices 102a and 102b to perform specific tasks. In some embodiments, the instructions may be executed by the one or more processors in response to interaction by the user. Two user computing devices are shown, but commercial implementations are expected to include more than one million, e.g., more than 10 million, geographically distributed over North America or the world. In some embodiments, one or more of the user computing devices 102a or 102b may be included in a private network 110. For example, the user computing device 102b may be included in a private network 110 that is associated with an enterprise (e.g., a library, a museum, an auction house, an insurance company, an appraisal company, or any other enterprise that would be apparent to one of skill in the art in possession of the present disclosure).

The user computing devices 102a and 102b may include a communication system having one or more transceivers to communicate with other user computing devices or the service provider computing device 104. Accordingly, and as disclosed in further detail below, the user computing devices 102a and 102b may be in communication with systems directly or indirectly. As used herein, the phrase "in communication," and variants thereof, is not limited to direct communication or continuous communication and can include indirect communication through one or more intermediary components or selective communication at periodic or aperiodic intervals, as well as one-time events.

For example, the user computing devices 102a and 102b in the data modeling system 100 of FIG. 1 may include first (e.g., relatively long-range) transceiver to permit the user computing devices 102a and 102b to communicate with the network 108 via a communication channel. In various embodiments, the network 108 may be implemented as a single network or a combination of multiple networks. For example, in various embodiments, the network 108 may include the Internet or one or more intranets, landline networks, wireless networks, or other appropriate types of communication networks. In another example, the network 108 may comprise a wireless telecommunications network adapted to communicate with other communication networks, such as the Internet. The wireless telecommunications network may be implemented by an example mobile cellular network, such as a long-term evolution (LTE) network or other third generation (3G), fourth generation (4G) wireless network, fifth generation (5G) wireless network or any subsequent generations. In some examples, the network 108 may be additionally or alternatively be implemented by a variety of communication networks, such as, but not limited to (which is not to suggest that other lists are limiting), a satellite communication network, a microwave radio network, or other communication networks.

The user computing devices 102a and 102b additionally may include second (e.g., short-range relative to the range of the first transceiver) transceiver to permit the user computing device 102a and 102b to communicate with each other or other user computing devices via a direct communication channel. Such second transceivers may be implemented by a type of transceiver supporting short-range (i.e., operate at distances that are shorter than the long-range transceivers) wireless networking. For example, such second transceivers may be implemented by Wi-Fi transceivers (e.g., via a Wi-Fi Direct protocol), Bluetooth® transceivers, infrared (IR) transceivers, and other transceivers that are configured to allow the user computing devices 102a and 102b to communicate with each other or other user computing devices via an ad-hoc or other wireless network.

The data modeling system 100 may also include or may be in connection with the service provider computing device 104. For example, the service provider computing device 104 may include one or more server devices, storage systems, cloud computing systems, or other computing devices (e.g., desktop computing device, laptop/notebook computing device, tablet computing device, mobile phone, etc.). In various embodiments, service provider computing device 104 may also include various combinations of hardware or software having one or more processors and capable of reading instructions stored on a tangible non-transitory machine-readable medium for execution by the one or more processors. Consistent with some embodiments, the service provider computing device 104 includes a machine-readable medium, such as a memory (not shown) that includes instructions for execution by one or more processors (not shown) for causing the service provider computing device 104 to perform specific tasks. In some embodiments, the instructions may be executed by the one or more processors in response to interaction by the user. The service provider computing device 104 may also be maintained by an entity with which sensitive credentials and information may be exchanged with the user computing devices 102a and 102b. The service provider computing device 104 may further be one or more servers that hosts applications for the user computing devices 102a and 102b. The service provider computing device 104 may be more generally a web site, an online content manager, a service provider, a social networking provider, or other entity who provides media content (e.g., video content, audio content, visual content, text content, audiovisual content, haptic content, or any other media content that would be apparent to one of skill in the art in possession of the present disclosure) or services to the user. The service provider computing device 104 may include various applications and may also be in communication with one or more external databases, that may provide additional information that may be used by the service provider computing device 104.

Figure 2:
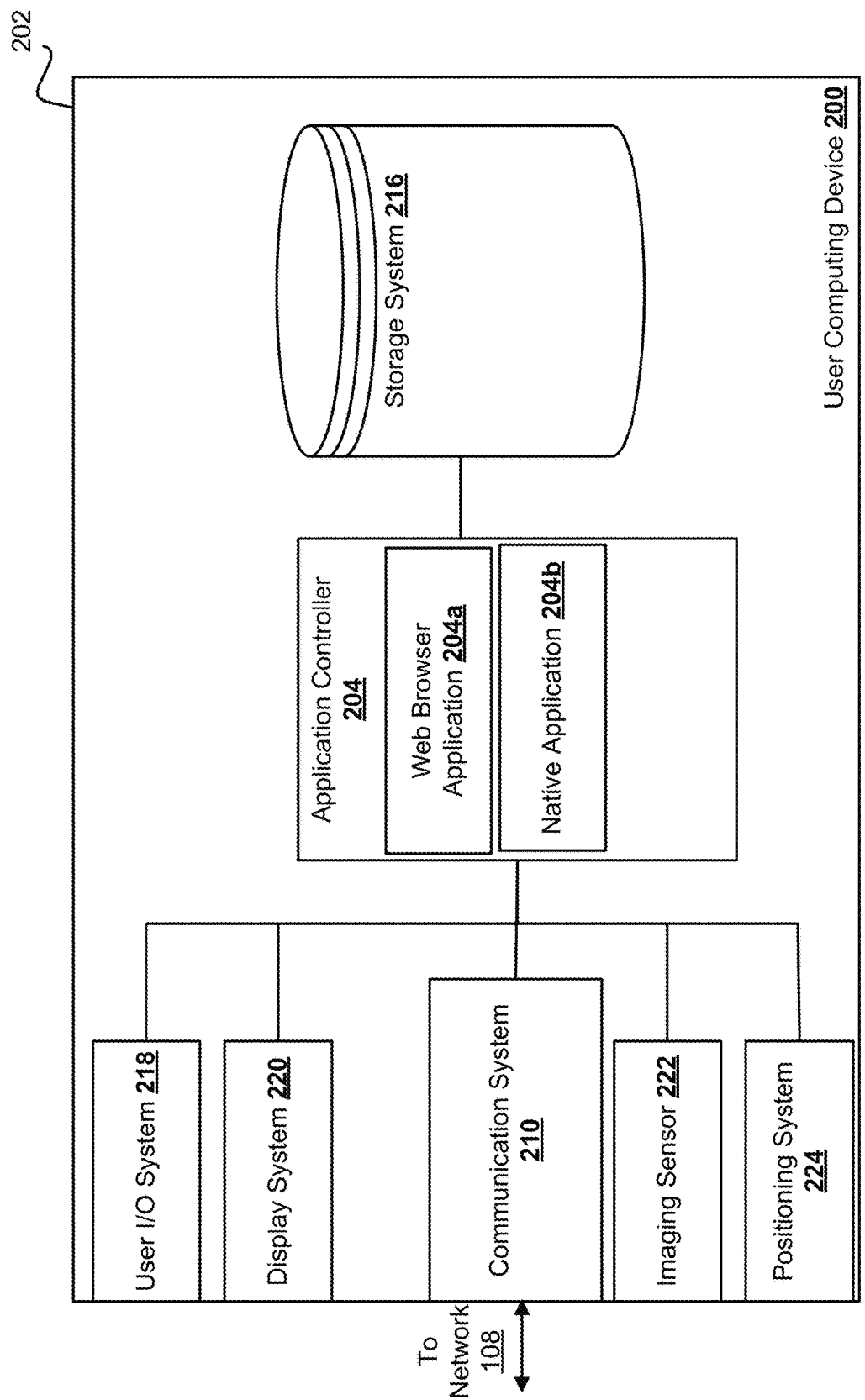
FIG. 2 is a block diagram illustrating an example of a user computing device of the data modeling system of FIG. 1, in accordance with some embodiments of the present disclosure.

FIG. 2 illustrates an embodiment of a user computing device 200 that may be the user computing device 102a or 102b discussed above with reference to FIG. 1. In the illustrated embodiment, the user computing device 200 includes a chassis 202 that houses the components of the user computing device 200. Several of these components are illustrated in FIG. 2. For example, the chassis 202 may house a processing system and a non-transitory memory system that includes instructions that, when executed by the processing system, cause the processing system to provide an application controller 204 that is configured to perform the functions of the application controller, augmented reality devices, or the user computing devices discussed below. In the specific example illustrated in FIG. 2, the application controller 204 is configured to provide one or more of a web browser application 204a or a native application 204b.

The chassis 202 may further house a communication system 210 that is coupled to the application controller 204 (e.g., via a coupling between the communication system 210 and the processing system). The communication system 210 may include software or instructions that are stored on a computer-readable medium and that allow the user computing device 200 to send and receive information through the communication networks discussed above. For example, the communication system 210 may include a communication interface to provide for communications through the network 108 as detailed above (e.g., first (e.g., long-range)

transceiver). In an embodiment, the communication interface may include a wireless antenna that is configured to provide communications with IEEE 802.11 protocols (Wi-Fi), cellular communications, satellite communications, other microwave radio communications or communications. The communication system 210 may also include a communication interface (e.g., the second (e.g., short-range) transceiver) that is configured to provide direct communication with other user computing devices, sensors, storage devices, beacons, and other devices included in the data modeling system 100 discussed above with respect to FIG. 1. For example, the communication interface may include a wireless antenna that configured to operate according to wireless protocols such as Bluetooth®, Bluetooth® Low Energy (BLE), near field communication (NFC), infrared data association (IrDA), ANT®, Zigbee®, Z-Wave® IEEE 802.11 protocols (Wi-Fi), or other wireless communication protocols that allow for direct communication between devices.

The chassis 202 may house a storage device (not illustrated) that provides a storage system 216 that is coupled to the application controller 204 through the processing system. The storage system 216 may be configured to store data, applications, or instructions described in further detail below and used to perform the functions described herein. In various embodiments, the chassis 202 also houses a user input/output (I/O) system 218 that is coupled to the application controller 204 (e.g., via a coupling between the processing system and the user I/O system 218). In an embodiment, the user I/O system 218 may be provided by a keyboard input subsystem, a mouse input subsystem, a track pad input subsystem, a touch input display subsystem, a microphone, an audio system, a haptic feedback system, or any other input subsystem. The chassis 202 also houses a display system 220 that is coupled to the application controller 204 (e.g., via a coupling between the processing system and the display system 220) and may be included in the user I/O system 218. In some embodiments, the display system 220 may be provided by a display device that is integrated into the user computing device 200 and that includes a display screen (e.g., a display screen on a laptop/notebook computing device, a tablet computing device, a mobile phone, or wearable device), or by a display device that is coupled directly to the user computing device 200 (e.g., a display device coupled to a desktop computing device by a cabled or wireless connection).

The chassis 202 may also house an imaging sensor 222 (e.g., a two-dimensional image capturing camera, a three-dimensional image capturing camera, an infrared image capturing camera, an ultraviolet image capturing camera, a depth capturing camera, similar video recorders, or a variety of other image or data capturing devices) that is coupled to the application controller 204 through the processing system. The imaging sensor 222 may be a camera, a photodetector, or any other photo sensor device that may be used to gather visual information from a physical environment surrounding the user computing device 200.

The chassis 202 may also include a positioning system 226 that is coupled to the application controller 204 through the processing system. The positioning system 226 may include sensors for determining the location and position of the user computing device 200 in the physical environment. For example, the positioning system 226 may include a global positioning system (GPS) receiver, a real-time kinematic (RTK) GPS receiver, a differential GPS receiver, a Wi-Fi based positioning system (WPS) receiver, an accelerometer, a gyroscope, a compass, or any other sensor for detecting or calculating the orientation or movement of the user computing device 200, or other positioning systems and components.

Figure 3:
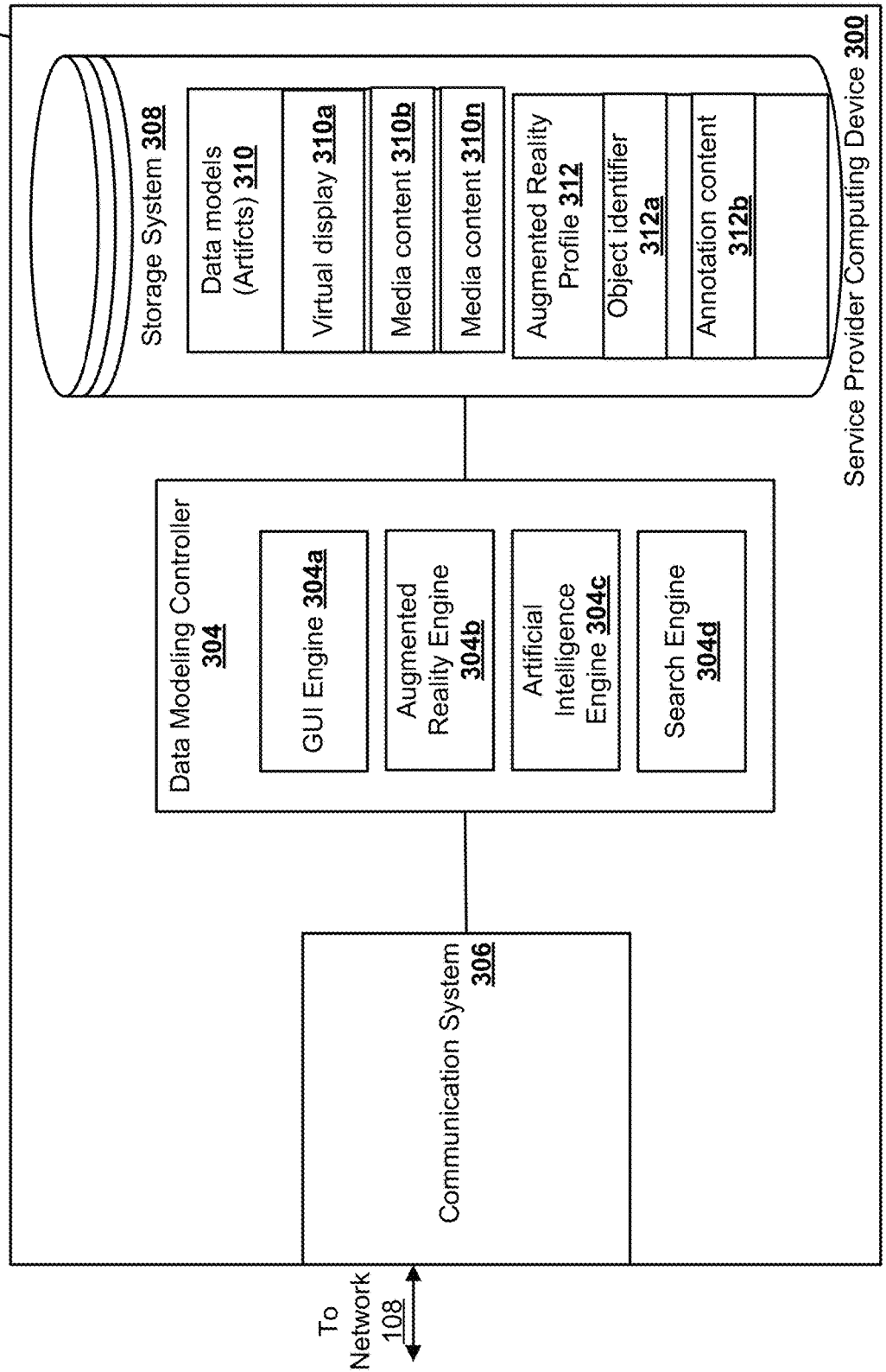
FIG. 3 is a block diagram illustrating an example of a service provider server computing device of the data modeling system of FIG. 1, in accordance with some embodiments of the present disclosure.

FIG. 3 depicts an embodiment of a service provider computing device 300, which may be the service provider computing device 104 discussed above with reference to FIG. 1. In the illustrated embodiment, the service provider computing device 300 includes a chassis 302 that houses the components of the service provider computing device 300, only some of which are illustrated in FIG. 3. For example, the chassis 302 may house a processing system (not illustrated) and a non-transitory memory system (not illustrated) that includes instructions that, when executed by the processing system, cause the processing system to provide a data modeling controller 304 (e.g., an Artifcting controller) that is configured to perform the functions of the data modeling controller or service provider server devices discussed below. The data modeling controller 304 may include a graphical user interface (GUI) engine 304a used to generate GUIs and GUI elements, discussed below. The data modeling controller 304 may also include an augmented reality engine 304b to perform the augmented reality functionality, discussed below. Furthermore, the data modeling controller 304 may include an artificial intelligence engine 304c to perform natural language processing algorithms and machine learning algorithms, discussed below. Further still, the data modeling controller 304 may include a search engine 304d to perform search and navigation of data models/Artifcts.

The chassis 302 may further house a communication system 306 that is coupled to the content management and data modeling 304 (e.g., via a coupling between the communication system 306 and the processing system) and that is configured to provide for communication through the network 108 of FIG. 1 as detailed below. The communication system 306 may allow the service provider computing device 300 to send and receive information over the network 108 of FIG. 1. The chassis 302 may also house a storage device (not illustrated) that provides a storage system 308 that is coupled to the data modeling controller 304 through the processing system. The storage system 308 may be configured to store data models 310 that include a virtual display 310a, media content 310b, and up to media content 310n. The storage system 308 may include an augmented reality profiles 312 that may include an object identifier 312a and annotation content 312b. However, other data or instructions to complete the functionality discussed herein is contemplated. In various embodiments, the storage system 308 may be provided on the service provider computing device 300 or on a database accessible via the communication system 306.

Figure 4:
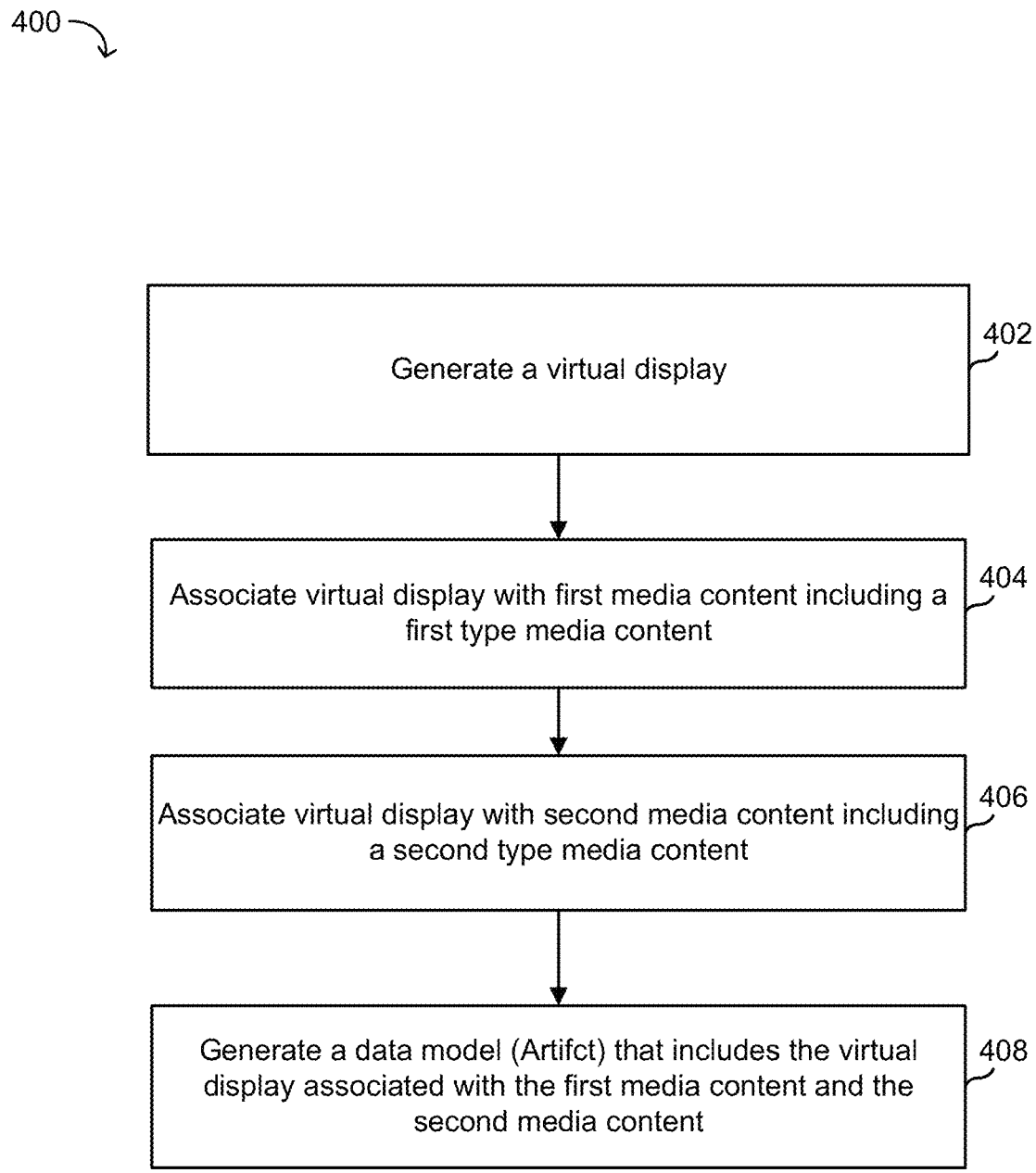
FIG. 4 is a flow diagram illustrating an example of a method of the data modeling media content with various media content types, in accordance with some embodiments of the present disclosure.

FIG. 4 depicts an embodiment of a method 400 of data modeling (Artifcting), which in some embodiments may be implemented with the components of FIGS. 1, 2, and 3 discussed above. As discussed below, some embodiments make technological improvements to content management, virtual reality, machine learning, augmented reality, and other technology areas. The method 400 is described as being performed by the data modeling controller 304 included on the service provider computing device 104/300. Furthermore, it is contemplated that the user computing device 200 may include some or all the functionality of the data modeling controller 304. As such, some or all of the steps of the method 400 may be performed by the user computing device 200 and still fall under the scope of the present disclosure. As mentioned above, the service provider computing device 104/300 may include one or more processors or one or more servers, and thus the method 400 may be distributed across the those one or more processors or the one or more servers.

The method 400 may begin at block 402 where a virtual display of an object is generated. In an embodiment, at block 402, the data modeling controller 304 may generate a virtual display of an object. The object may be a physical object or a virtual object. For example, a user of the user computing device 102*a* may possess a physical object. The user may use the user computing device 102*a* that includes the imaging sensor 222 such as, but not limited to, a scanning device (e.g., a two-dimensional scanner, a three-dimensional scanner), a camera system (e.g., a two-dimensional camera, a three-dimensional camera), or a microscope (e.g., a two-dimensional microscope, a three-dimensional microscope). However, the imaging sensor 222 may include any other device that can capture images of the physical object and process those images or provide those images to the service provider computing device 104/300 such that the data modeling controller 304 included on the service provider computing device 104/300 can process those images and generate a virtual display (e.g., a two-dimensional model or a three-dimensional model) of the physical object. The captured images or a generated virtual display may be provided by the user computing device 102*a* via the web browser application 204*a* or the native application 204*b*.

As used herein, the virtual display may include a version, a copy, a representation, or a derivative of the physical object and may not necessarily be displayed but may include content that is stored and that may be displayed. In various embodiments, the virtual display is stored on the storage system 308 and included in the virtual display 310*a* of a data model 310 (e.g., an Artifct). The data model 310 may include a unique data model identifier such that the virtual display 310*a* is assigned with that data model identifier. The virtual display 310 may be reassigned to a different data model identifier or may be assigned to a plurality of data model identifiers. While the object herein is described as a physical object, the object may include virtual objects that are computer generated and do not have a corresponding physical counterpart. For example, the virtual object may include a non-fungible token (NFT), digital art, a gaming object, or any other virtual object that would be apparent to one of skill in the art in possession of the present disclosure.

The method 400 may then proceed to block 404 where the virtual display of the object is associated with first media content including a first type media content. In an embodiment, at block 404, the user may upload or create, via the web browser application 204*a* or the native application 204*b*, media content that is provided to the data modeling controller 304. For example, the data modeling controller 304 may provide via the GUI engine 304*a* one or more text fields that are displayed at the user computing device 102*a* or 102*b* via the application controller 204 and the display system 220. The user may describe the object associated with the virtual display, tell a story about the object, describe a significance or sentimental value of the object, provide location information as to where the object is located or possessed by the user, or provide any other textual content that includes information about the object associated with the virtual display of the object. In some embodiments, the first media content may include a second type media content. For example, instead of text content, the first media content may include audio content, video content, photo content, haptic content, or any other type of content that would be apparent to one of skill in the art in possession of the present disclosure. The content may be provided by the user computing device 102*a* or 102*b*, via a third-party database, or created by the user using application tools provided by the data modeling controller 304. For example, the data modeling controller 304 may provide a media player that may be used by the user computing device 102*a*/200 and the user I/O system 218 or imaging senor 222 to record audio or video content that is stored at the service provider computing device 104/300.

In various embodiments, the media content may be generated by the user or the artificial intelligence engine 304*c*. The artificial intelligence engine 304*c* may include content generation algorithms that generates content form information obtained from the virtual display or content provided by the user. For example, natural language processing may be integrated into the artificial intelligence engine 304*c* to allow for prompting users for additional information about their object and virtual display. For example, the artificial intelligence engine 304*c* and the GUI engine 304*a* may produce prompts such as, but not limited to, "Where did you get the object?," "Who gave it to you?" or other prompts. In other examples, there may be an automated free text guide that users may enable within the text form to prompt users with the beginning of a story ("I remember when I got this {object name}, it was [fill in the blank] and I was with [fill in the blank]."). Users could complete or skip specific prompts to help add details/fill in the blanks in the description field of their object. The GUI engine 304*a* could also encourage the user to share with others to add additional details that the user may not remember or know.

In another embodiment, users are often in possession of objects without knowing much if anything about the origins of the objects, what they are made of, what the symbols, icons, or other markings mean, and the like. A machine learning algorithm in the artificial intelligence engine 304*c* may assist and reveal potential details from internet-based sources and libraries, including appraisal sources, marketplace and auction listings, media outlets, social media, or other third-party data providers. For example, feature points may be obtained from the virtual display and compared to feature points of objects in the databases to determine whether matches or similarity conditions exist and use information associated with those objects that are determined to match and that the machine learning algorithm recognizes that the user will likely incorporate in the media content or data model. The user may choose what to do with that information (ignore, add to the data model, ask later, or other options). Based on what the user does with the information, the machine learning algorithm may use that action information as feedback in making more meaningful suggestions that a user is likely going to incorporate while ignoring information that the user is not likely to incorporate into the data model. This feedback may save on processing, storage, and network resources as it selectively provides information based with the likelihood it will be used while limiting other information that is not likely to be used. The "about" information can also be applied to suggest to the user appropriate data model categories and tags to apply to a data model as well as to suggest to a user how to organize the user's collection of data models (Artifcts) into custom categories.

Figure 5:
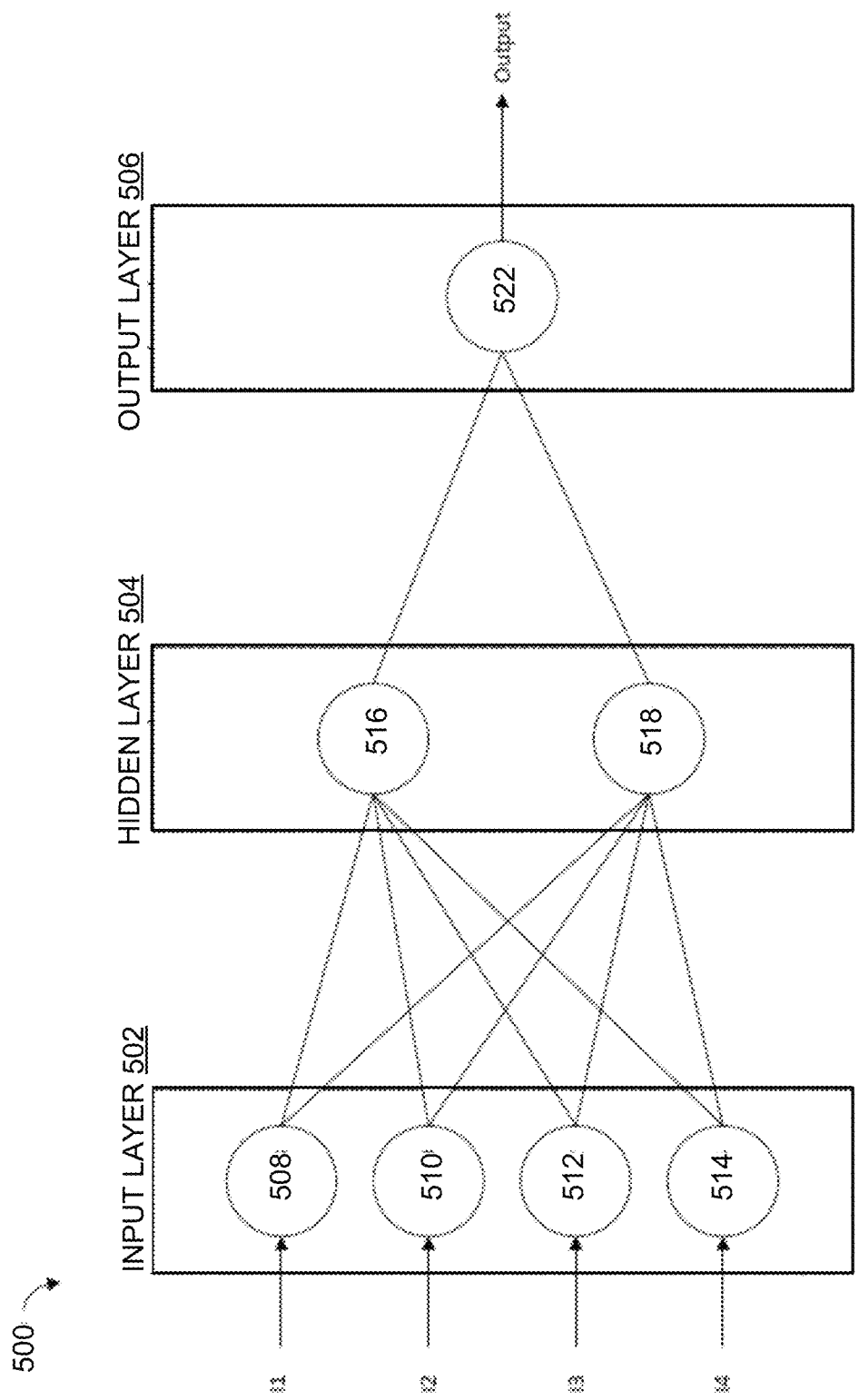
FIG. 5 is an artificial neural network, in accordance with some embodiments of the present disclosure.

Referring now to FIG. 5 an artificial neural network according to an embodiment of the present disclosure is illustrated. An example artificial intelligence engine 304*c* may be implemented as an artificial neural network 500. As illustrated, the artificial neural network 500 includes three layers—an input layer 502, a hidden layer 504, and an output layer 506. Each of the layers 502, 504, and 506 may include one or more nodes. For example, the input layer 502 includes nodes 508-514, the hidden layer 504 includes nodes 516-518, and the output layer 506 includes a node 522. In this example, each node in a layer is connected to every node in an adjacent layer. For example, the node 508 in the input layer 502 is connected to both of the nodes 516-518 in the hidden layer 504. Similarly, the node 516 in the hidden layer is connected to all of the nodes 508-514 in the input layer 502 and the node 522 in the output layer 506. Although only one hidden layer is shown for the artificial neural network 500, it has been contemplated that the artificial neural network 500 used by the environment modeling/localization controller 304 may include as many hidden layers as necessary. As discussed above, the unsupervised neural network may be provided as the input layer 502 and multiple hidden layers while the supervised neural network may be provided as multiple hidden layers and the output layer 506.

In this example, the artificial neural network 500 receives a set of input values and produces an output value. Each node in the input layer 502 may correspond to a distinct input value (e.g., a model parameter). For example, the node 508 may correspond to a first parameter of a model, the node 510 may correspond to a second parameter of the model, the node 512 may correspond to a third parameter of the model, and the node 514 may correspond to the deviation computed for the model.

In some embodiments, each of the nodes 516-518 in the hidden layer 504 generates a representation, which may include a mathematical computation (or algorithm) that produces a value based on the input values received from the nodes 508-514. The mathematical computation may include assigning different weights to each of the data values received from the nodes 508-514. The nodes 516 and 518 may include different algorithms and/or different weights assigned to the data variables from the nodes 508-514 such that the nodes 516-518 may produce different values based on the same input values received from the nodes 508-514. The values generated by the nodes 516 and 518 may be used by the nodes 522 in the output layer 506 to produce an output value for the artificial neural network 500.

For example, and according to various embodiments of the present disclosure, the input values associated with the nodes 508-514 of the input layer may include the virtual display, feature points of the virtual display associated with the data model, or any of the other media content included in the data model. The node 522 included in the output layer may include a classification of the object illustrated in the virtual display. The output layer may be used to search and locate other media content that is associated with the classification. While a particular machine learning algorithm is illustrated, one of skill in the art in possession of the present disclosure will recognize that other supervised or unsupervised machine learning algorithms may be used to classify objects in virtual displays or media content included in a data model to provide suggestions of additional media content to include with the data model.

The method 400 may then proceed to block 406 where the virtual display of the object is associated with second media content that includes second type media content. In an embodiment, at block 406, the data modeling controller 304 may associate additional media content to the data model and the virtual display. For example, the additional media content may include a second type of media content that is different than the first type of media content associated at block 404. In an embodiment, the additional media content may be generated or obtained similarly to how the media content in block 404 was obtained or generated. In both block 404 and 406, all the media content may be associated with a virtual object or the data model that encompasses the virtual object by assigning a data model identifier for the media content. In other examples, a virtual display identifier may be associated with the media content and the data model includes the resulting group of the virtual display and media content of one or more types.

The method 400 may then proceed to block 408 where a data model that includes the virtual display associated with the first media content and the second media content is generated. In an embodiment, at block 408, the data modeling controller 304 may generate a data model (e.g., an Artifct). The data model may include the virtual display, the first media content, and the second media content. The various media content and the virtual display may be packaged together under a single data model identifier for the data model. The data model can vary for usage and storage so it can be easily rendered, stored, selected, or extracted. The data model for storage can be spread over different kinds of storage like database records, files, etc. Each data model or Artifct can be treated as a point in a multi-dimensional space with axis like type, tags, age, country, etc. With this approach, Artifcts may be combined into different one-axis structures for navigation (view or sort by type, by age, by country etc), can be automatically clustered into related groups. Artifcts media file types are not limited only to images, video and audio but can be extended to any other specific formats which may be projected into visual or sound form to be used on the virtual display.

Figure 6:
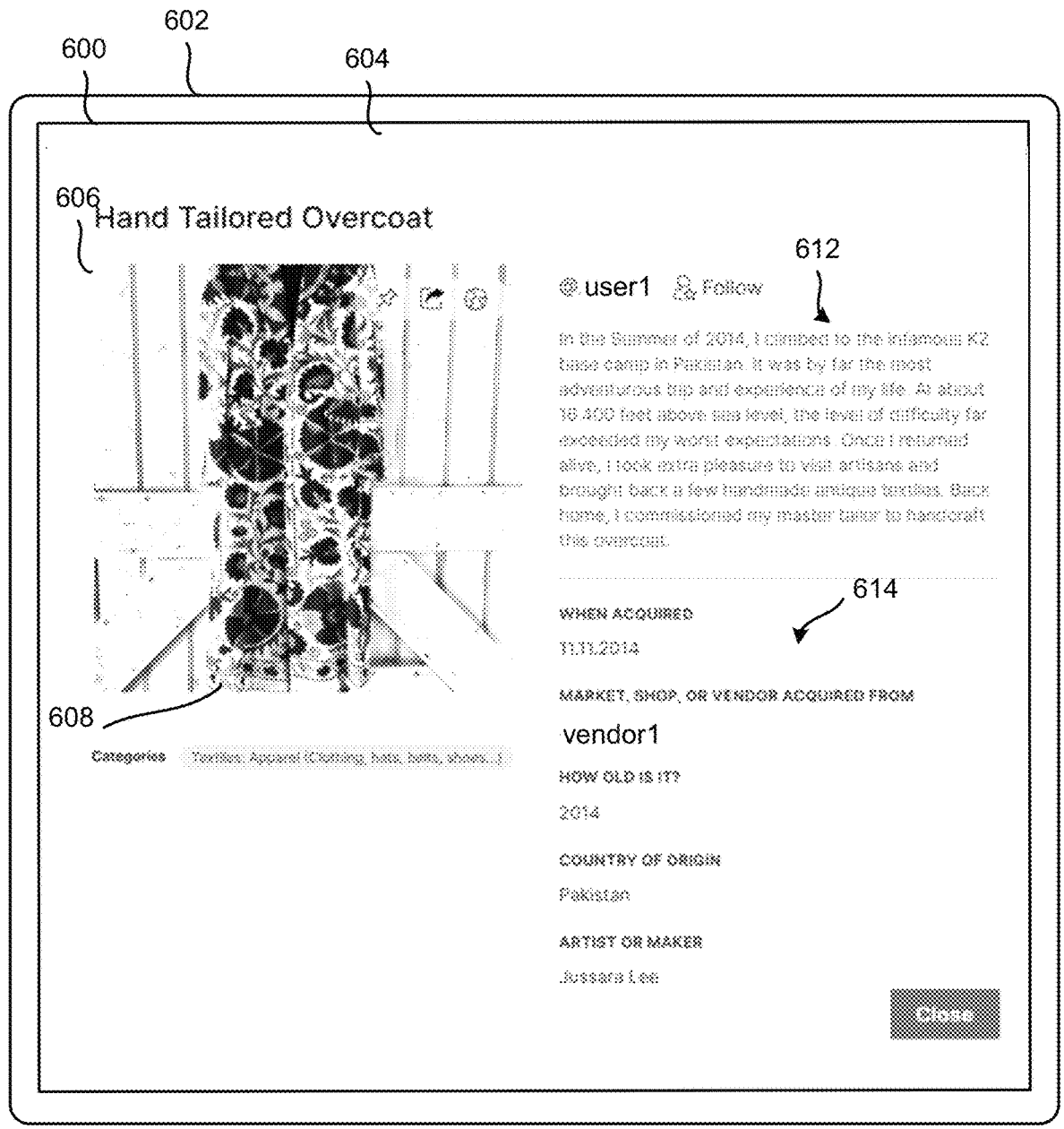
FIG. 6 illustrates a graphical user interface (GUI) during some embodiments of the method of FIG. 4, in accordance with some embodiments of the present disclosure.

FIG. 6 illustrates a graphical user interface 600 included on a display device 602 that is included on the display system 220 of FIG. 2. The graphical user interface 600 includes an example data model 604 (e.g., Artifct). The data model 604 may include a virtual display 606 of an object 608 that may be a physical "Hand Tailored Overcoat," as an example. In addition, the data model 604 may include media content 610 and media content 612. While the media content 610 and 612 are illustrated as text content, the media content 610 or 612 may include video content, audio content, other virtual display content or other media content. Furthermore, the media content may include two or more media content items. The media content may include nth media content. This entire corpus of media content may be transferred together as a data model when transferred between users.

The method 400 of FIG. 4 may then proceed to block 410 where an action is performed using the data model. In an embodiment, at block 410, the data modeling controller 304 may perform an action with the data model. In one embodiment, the data modeling controller 304 may store the data mode in the storage system 308 such as in a repository of the data models 310 that include the virtual display 310a, media content 310b and up media content 310n.

In other embodiments, the data modeling controller 304 may generate a non-fungible token of the data model according to a token standard. A token may refer to an entry in the blockchain that belongs to a blockchain address. The entry may comprise information indicating ownership of an asset. The token may represent money, a contract, property, records, access rights, status, supply, demand, alarm, trigger, reputation, a ticket, or any other asset that may be represented in digital form. For example, a token may refer to an entry related to cryptocurrency that is used for a specific purpose or may represent ownership of a real-world asset, such as Fiat currency, real-estate, sports memorabilia, physical artwork, comic books, and/or any other physical object that would be apparent to one of skill in the art in possession of the present disclosure. Token contracts refer to cryptographic tokens that represent a set of rules that are encoded in a smart contract. The person that owns the private key corresponding to the blockchain address may access the token(s) at the address. Thus, the blockchain address may represent an identity of the person that owns the token(s). Only the owner of the blockchain address may send the token to another person. The tokens may be accessible to the owner via the owner's wallet. The owner of a token may send or transfer the token to a user via a blockchain transaction. For example, the owner may sign the transaction corresponding to the transfer of the token with the private key. When the token is received by the user, the token may be recorded in the blockchain at the blockchain address of the user.

A token may implement a token standard. For example, a token may be implemented according to the ERC-20 standard, the ERC-721 standard, the ERC-994 standard, the ERC-998 standard, the ERC-1155 standard, and/or any other token standard configured for the Ethereum blockchain network or other blockchain network that includes a virtual machine for executing contract bytecode on its blockchain as would be apparent to one of skill in the art in possession of the present disclosure. Each token standard may have different requirements of features that a token must have to be considered a token that implements that standard and that can be used by smart contracts or applications that also are generated according to the token standard. For example, a token that implements the ERC-20 standard is a fungible token and must have six mandatory rules of: totalSupply, balanceOf, transfer, transferFrom, approve, and allowance. In other examples, a token that implements the ERC-721 standard is a non-fungible token. As would be apparent to one of skill in the art in possession of the present disclosure, a fungible token is a token that is indistinguishable from another token of the same type while a non-fungible token would be a unique token that can be distinguished from another token. A token that implements the ERC-994 standard and the ERC-994 standard may be a non-fungible token and may be hierarchical with other tokens that implement the ERC-994 standard. In other words, the tokens may form a tree-like structure of parent/child non-fungible tokens. In yet other examples, tokens that implement the ERC-1155 standard may be minted from a single smart contract, rather than a smart contract for each token as is required in many of the other standards. As such, the smart contract that implements the ERC-1155 standard has the ability to generate both non-fungible and fungible tokens. While specific token standards are discussed, other token standards for other blockchains may be contemplated. For example, a token standard on the EOS blockchain may be contemplated. Also, a standard that may be used to store a non-fungible token across more than one blockchain may also be contemplated.

Figure 7:
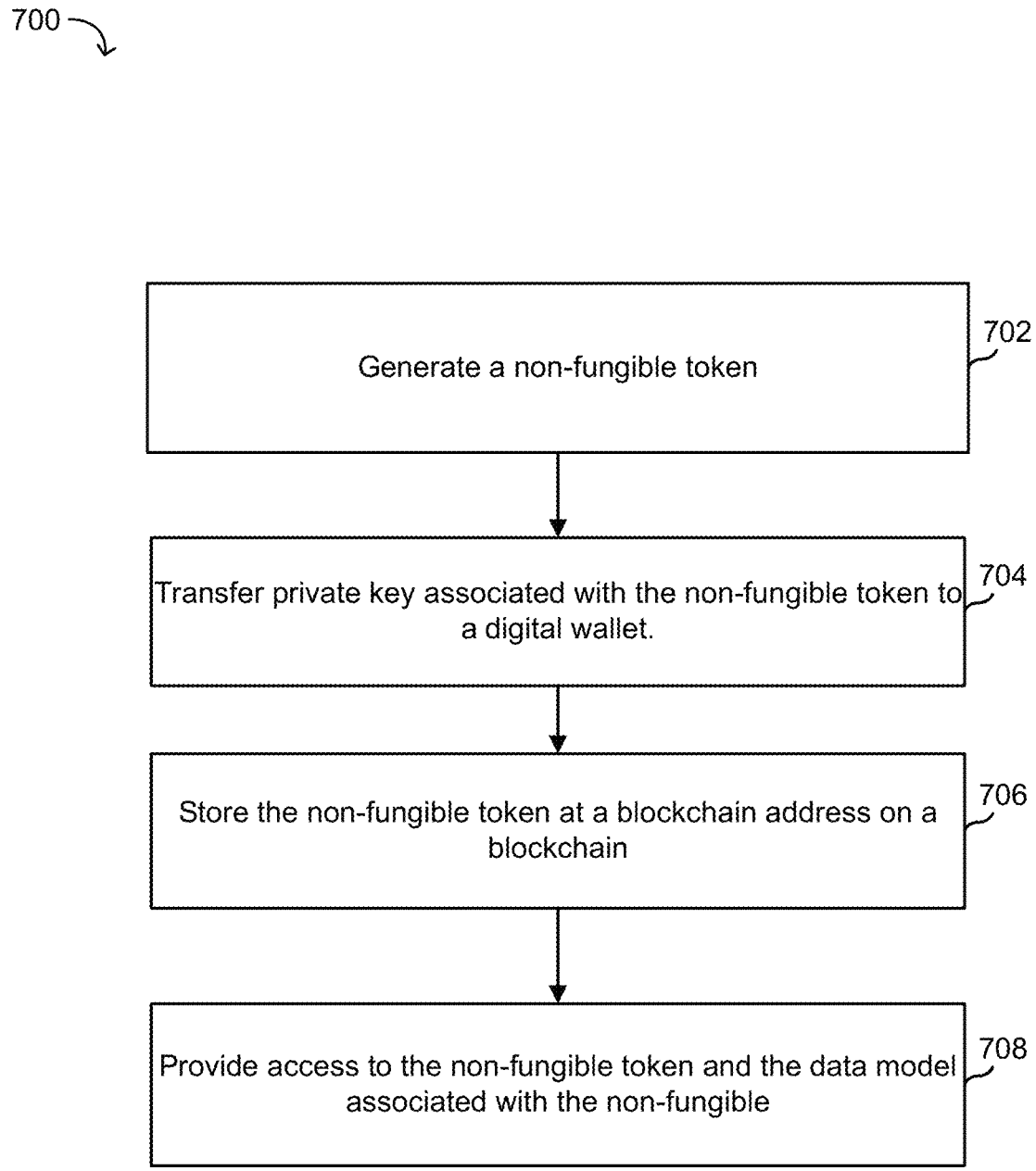
FIG. 7 is a flow diagram illustrate an example method of generating a non-fungible token for an data model, in accordance with some embodiments of the present disclosure.

FIG. 7 illustrates a flowchart of a method 700 for tokenizing data models described herein. The method 700 begins at block 702 where a non-fungible token is generated. In an embodiment, at block 702, the data modeling controller 304 may execute instructions that provides a token generator that generates a non-fungible token that implements a non-fungible tokenization standard. At block 704, a private key associated with the non-fungible token is transferred to a digital wallet. In an embodiment at block 704 the data modeling controller 304 may transfer the private key associated with the non-fungible token to a digital wallet that is associated with the user and user device 102*a*. However, in other embodiments, the data modeling controller 304 may generate or have previously generated a smart contract that is configured to cause a virtual machine of a blockchain network to generate the non-fungible token for the data model upon certain conditions being satisfied. The smart contract may be uploaded or submitted to a blockchain network as a transaction. The method 700 proceeds to block 706 where a non-fungible token is stored at a blockchain address on a blockchain. In an embodiment, the non-fungible token may be stored at a blockchain address on a blockchain by the data modeling controller 304 or by a smart contract. The method 700 proceeds to block 708 where access is provided to the non-fungible token and the data model associated with it. In an embodiment, at block 708, the entity (e.g., the user) that possess the private key corresponding to the blockchain address may access the non-fungible token at the blockchain address and the data model associated with the non-fungible token.

In another example, a user associated with the data model or another user, by request, may view, edit, or otherwise access the data model. The data modeling controller 304 may process any user requests associated with the data model. When publishing or otherwise generating that data model, a user may assign permissions to the data model. These permissions become part of the data model as well. The permission may block or allow certain requests (e.g., edit requests, content consumption requests, or other requests) from other users (e.g., a user associated with the user computing device 102*b*). The permissions may be user specific or group specific. If the action is a view request, the data modeling controller 304 may provide, via the GUI engine 304*a*, the data model including at least one of the virtual display, the first media content, or the second media content to the user associated with the user computing device 102*b*, which may not be the owner of the data model.

In yet other embodiments, the users may assign a "Legacy Contact." The contact is notified that the contact has been selected as such and may in the future request control of the assignee's data models after providing legal proof the original user is deceased or otherwise incapacitated.

In yet other embodiments, the action may include selling or upcycling. For a data model that an owner wishes to sell or donate, the data modeling controller 304 may transfer the data model between user accounts.

In other embodiments, the data modeling controller 304 may perform content moderation. Content moderation by the data modeling controller 304 may include running, via the artificial intelligence engine 304*c*, a machine learning algorithm that is configured to detect that one or more of the virtual display, the first media content, or the second media content violates a content policy and perform a moderation action based on the policy violated. The moderation action may include providing a warning to users attempting to access the data model, deleting the data model, allowing only a private view of the data model by the user that owns it, allowing only a portion of the data model to be viewed by other users that does not violate the content policy while blocking the media content that does violate the content policy.

In other embodiments, the artificial intelligence engine 304*c* paired with metadata and media documentation of each data model will allow the data modeling controller 304 to suggest other data models (Artifcts) and users that have user accounts with the service provider associate with the service provider computing device 104/300 to establish connection through shared interests.

Figure 8:
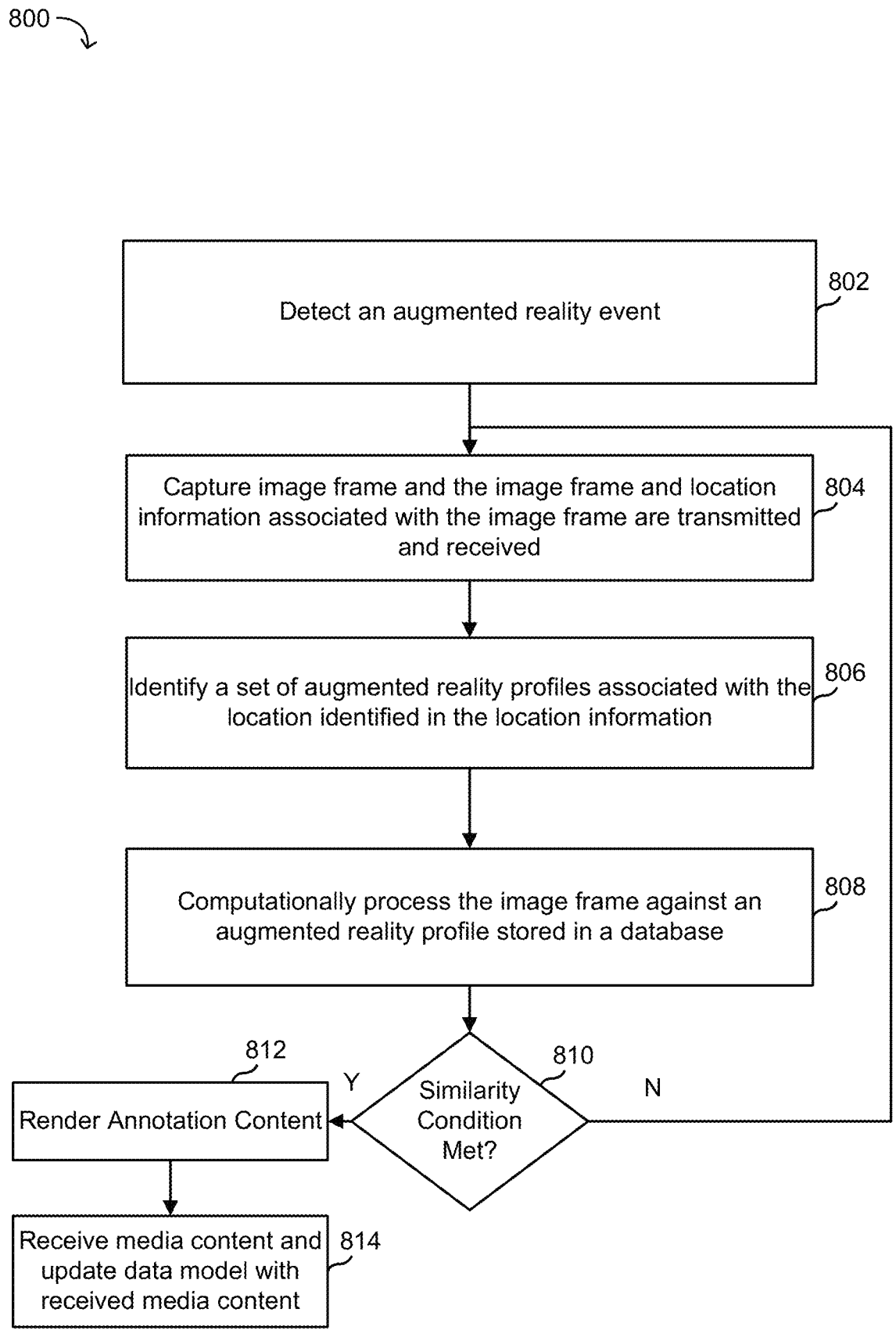
FIG. 8 is a flow diagram illustrating an example method of augmented reality with a data model, in accordance with some embodiments of the present disclosure.

In yet another embodiment, the data models may be used in an augmented reality system. FIG. 8 depicts a method 800 of augmented reality with a data model. The method 800 is described as being performed by the data modeling controller 304 included on the service provider computing device 104/300. Furthermore, it is contemplated that the user computing device 200 may include some or all the functionality of the data modeling controller 304. As such, some or all of the steps of the method 800 may be performed by the user computing device 200 and still fall under the scope of the present disclosure. As mentioned above, the service provider computing device 104/300 may include one or more processors or one or more servers, and thus the method 800 may be distributed across those one or more processors or the one or more servers. Distributing the data augmented reality processing functions between the user computing device 102a/200 and the service provider computing device 104/300 may provide network, latency and other issues with augmented reality systems as discussed below.

The method 800 may begin at block 802 where an augmented reality event is detected. In an embodiment, at block 802, the augmented reality engine 304b may be running an augmented reality application via the application controller 204 of the user computing device 102a/200. The augmented reality engine 304b may be monitoring for an input from the user computing device 102a/200 that indicates that an augmented reality event has occurred, which initiates object recognition. For example, augmented reality engine 304b may monitor motion detector inputs provided by the positioning system 224. The augmented reality engine 304b or the application controller 204 may be monitoring the physical environment or the motion of the user computing device 102/200 operated by a user to determine whether the user intends to recognize an object inside a current image frame of an imaging sensor 222. By basing the augmented reality event on motion, the augmented reality engine 304b may trigger object recognition by avoiding specific user commands such as screen touch or voice input, which provides a seamless user experience. For example, the augmented reality engine 304b or application controller 204 may be monitoring for predetermined thresholds of steadiness of the user computing device 102a/200 or a vertical orientation of the user computing device 102a/200. Steady status of the user device may solve issues of motion blur when an image frame is captured for object recognition (i.e., objects in blurry image frames will not be recognized). Vertical status may filter out image frames that are irrelevant of the target. For example, when the imaging sensor 222 is facing a ceiling or the sky at a horizontal orientation, object recognition is not likely going to be performed unless the augmented reality engine 304b or application controller 204 is configured specific to such orientations. Thus, it is contemplated that other orientations and movements of the user computing device 102a/200 are contemplated to fall under the scope of this disclosure.

Furthermore, the augmented reality engine 304b or application controller 204 using the motion detector input from the positioning system 224 to determine an augmented reality event can continue to monitor the movement of the user computing device 102a/200 during the recognition procedure and causes the augmented reality engine 304b or application controller 204 to ignore object recognition results if a predetermined threshold of movement of the user computing device 102a/200 occurs during the object recognition procedure. Significant movement of the user computing device 102a/200 may cause a mismatch between the object recognition results and an image frame captured as discussed below. While the specific example of the augmented reality engine 304b or application controller 204 describes monitoring for motion detector inputs, one of skill in the art in possession of the present disclosure will recognize that the augmented reality engine 304b or application controller 204 may be monitoring for other inputs such as a user voice command, a touch input, an image input to trigger object recognition, or any other user input or input from the physical environment.

The method 800 may then proceeds to block 804 where an image frame is captured, and the image frame and location information associated with the image frame are transmitted and received. In an embodiment at block 804, the imaging sensor 222 on the user computing device 200 may capture an image frame of the physical environment and provide the image frame as an image input to the augmented reality engine 304b or application controller 204 as an image input. The image frame may include one or more objects from the physical environment. For example, a camera may capture an image frame as the image input and provide that image frame to a recognition proxy included in the augmented reality engine 304b or application controller 204 as the image frame. For example, the augmented reality engine 304b or application controller 204 that includes object recognition modules may be modified with the recognition proxy and can send object recognition requests that include the image frame to the recognition proxy.

In various embodiments, the application controller 204 may capture location information, for example via the GPS included in the positioning system 224. The location information may include coordinates or some other location information that identifies the location of the user computing device 102a/200 in the physical environment, which may include any indoor, outside, contiguous space, non-contiguous space, geofenced space, or other environment that would be apparent to one of skill in the art in possession of the present disclosure. The location information may be associated with the image frame and provided to the application controller 204 or the augmented reality engine 304b.

The method 800 may proceed to block 806 where a set of augmented reality profiles associated with the location identified in the location information are identified. In an embodiment, at block 806, the application controller 204 or the augmented reality engine 304b may search the augmented reality profiles 312 to determine a set of augmented reality profiles from the augmented reality profiles 312 that are associated or within a range (e.g., 10 feet, 100 feet, 800 feet, 1000 feet, 1 mile or any other range that may be apparent to one of skill in the art in possession of the present disclosure) of the location identified in the location information. By determining a set of augmented reality profiles from the augmented reality profiles 312 less processing resources are required when computationally processing the object or feature points of an object in an image frame against feature points of objects in the augmented reality profiles. In some embodiments, the objects and object feature points within the augmented reality profiles may be objects or object feature points obtained from the media content or virtual display associated with the data models. While the set of augmented reality profiles may be determined based on the location of the user computing device 102a/200, in other embodiments other user information may be used to identify augmented reality profiles for the set of augmented reality profiles. For example, user preferences may determine which augmented reality profiles are selected in the set such that a set of augmented reality profiles may be different for the user computing device 102a and the user computing device 102b when those user computing devices are at the same location or substantially in the same location.

The method 800 may then proceed to block 808 where the image frame is computationally processed against an augmented reality profile stored in a database. In an embodiment, at block 808, the application controller 204 or the augmented reality engine 304b may computationally process the image frame against one or more of the augmented reality profiles 312 or the set of augmented reality profiles determined at block 806 and that are provided in the storage system 308. The storage system 308 may extend to the storage system 216 include in the user computing device 102a/200. Providing the set of augmented reality profiles locally to the user computing device 200 may decrease latency times while not having to obtain the entire corpus of augmented reality profiles. In a specific example, the recognition proxy may provide the image frame along with an object recognition request to a scene matcher that is included in the application controller 204 or the augmented reality engine 304b. The scene matcher may have access to scene storage, which may include the object identifiers 312a (e.g., object feature points) of the augmented reality profiles. The scene matcher may have access to annotation content 312b. For example, each object identifier 312a may be associated with respective annotation content 312b such that when an image frame is computationally processed against the object identifiers 312a and there is substantial correspondence (e.g., within 99%, 95%, 90%, 80% correspondence) between an object in the image frame and an object identifier stored in the local augmented reality database, then the annotation content 312b that is associated with the object identifier 312a is retrieved for rendering as discussed in further detail below.

In an embodiment, the scene matcher included in the application controller 204 or the augmented reality engine 304b includes an object recognition algorithm to identify objects in the image frame. For example, the object recognition algorithm may include the scale-invariant feature transform (SIFT) algorithm, the speeded up robust features (SURF) algorithm, the oriented features from accelerated segment test (FAST) and rotated bianary robust independent elementary features (BRIEF) (ORB) algorithm, the FAST+ fast retina key point (FREAK) algorithm, the binary robust invariant scalable keypoints (BRISK) algorithm, or any other object recognition algorithm. In an embodiment, the scene matcher may include a probabilistic model to speed up object recognition on a mobile device such as the user computing device 102a/200. For example, the probabilistic model may include the gaussian mixture model (GMM) and the bernoulli mixture model (BMM). The probabilistic model may be selected based on the object recognition algorithm. For example, the object recognition algorithm may include BMM built upon ORB functions as GMM does not integrate with binary descriptors as found in ORB.

Using the object recognition algorithm, the application controller 204 or the augmented reality engine 304b may detect features (i.e. interest points) in the image frame that were provided by the recognition proxy in the object recognition request. For example, the application controller 204 or the augmented reality engine 304b may include a feature detector such as FAST, Harris and Stephens/Plessey/Shi-Tomasi, level curve curvature, Laplacian of the Gaussian (LoG), Difference of Gaussians, smallest univalue segment assimilating nucleus (SUSAN), or other feature detectors. Once the features are detected, the application controller 204 or the augmented reality engine 304b may extract the features from the image frame to provide the feature descriptors. the application controller 204 or the augmented reality engine 304b may encode the feature descriptors into a compact feature representation, (e.g., a Fisher Vector (FV)). The application controller 204 or the augmented reality engine 304b, then performs feature matching by calculating the distance between the compact feature representation and those (e.g., the object identifiers 312a) in scene storage one by one, as the local augmented reality database on user computing device 102a/200 has fewer augmented reality profiles than that of the storage system 308 in the network 108.

In various embodiments, the augmented reality profiles 312 may have been generated and stored in the storage system 308 prior to the method 800. For example, images of the physical environment were taken and objects identified. In other embodiments, the augmented reality profiles 312 may be generated from the data models and associated with a location that the object that is the basis of the data model is located or a location at which the object has been in the past (e.g., a store that it was bought, location of an event that is associated with the object, or other locations). An offline probabilistic model (e.g., Gaussian Mixture Model) may be built based on the feature points of all images in the network augmented reality database. Using this model, the feature descriptors of an image are encoded into a compact representation (e.g., a Fisher Vector). The compact feature representations of the images are stored using a hash function (e.g., Locality Sensitive Hashing, LSH) for faster retrieval. However, in other embodiments, one or more machine learning algorithms to perform supervised machine learning, unsupervised machine learning (e.g., deep belief networks, neural networks, statistical pattern recognition, rule-based artificial intelligence, etc.) semi-supervised learning, reinforcement learning, deep learning, and other machine learning algorithms when updating, creating, or reinforcing an augmented reality profile 312 or any other profile stored in the storage system 308 discussed herein that is updatable over time based on received image frames may be contemplated.

The method 800 may then proceed to decision block 810 where it is determined whether an object of the image frame satisfies a similarity condition with an object identified in an augmented reality profile. In an embodiment, at decision block 810, the application controller 204 or the augmented reality engine 304b may determine whether there is substantial correspondence between an object in the image frame and the object identifiers 312a in one or more augmented reality profiles 312. For example, the scene matcher, may perform feature matching, as described in block 808, by calculating the distance between the compact feature representation and those (e.g., the object identifiers 312a) in the augmented reality profiles 312. The objects of the image frame may have substantial correspondence with object identifiers 312a in the augmented reality profiles 312 when a predefined condition is satisfied. For example, the predefined condition may be that one or more compact feature representations of the object match the object identifiers 312a or satisfy a predetermined threshold of similarity (e.g., 50% similar, 60% similar, 70% similar, 80% similar, 85% similar, 90% similar, 95% similar, 99% similar, 100% similar and other thresholds of similarity) with the object identifiers 312a in the augmented reality profile 312. Substantial correspondence may also include situations where unsupervised machined learning techniques (e.g., using cluster analysis), or supervised machine learning techniques (e.g., using statistical classification) determines that compact feature representations of the object in one group are more similar to each other than those in other groups.

If it is determined that the object of the image frame substantially corresponds with an object identified in the augmented reality profile in decision block 810 of method 800, then method 800 proceeds to block 812, where the annotation content of the augmented reality profile is rendered relative to the object according to rendering instructions provided with the annotation content. In an embodiment at block 812, the application controller 204 or the augmented reality engine 304b, using the compact feature representation and the object identifiers 312a of the matching augmented reality profile in the local augmented reality database, determine the homography between the compact feature representation and the object identifier to find their geometric transformation. The application controller 204 or the augmented reality engine 304b then adjusts the corresponding object recognition result of the object identifiers according to the homography, to determine an initial pose (i.e., position and orientation) of the object, which becomes the result for the image frame that was provided in the object recognition request. The application controller 204 or the augmented reality engine 304b may provide the initial pose of the object as well as the associated annotation content 312b for that object to the recognition proxy. The annotation content 312b may include rendering instructions that define how the annotation content is to be rendered in relation to the object recognized. The recognition proxy may provide the initial pose to a visual tracker included the application controller 204 or the augmented reality engine 304b and the annotation content to an annotation render included in the application controller 204 or the augmented reality engine 304b.

A visual tracker included in the application controller 204 or the augmented reality engine 304b may track the pose of an object as the user computing device 102a/200 or the imaging sensor 222 changes its view of the object. The visual tracker may be initialized by the recognition proxy such that the visual tracker uses the initial pose of the object as its starting point and uses continuous image frames being received from the imaging sensor 222 as the image inputs and calculates a tracked pose of the object for each frame. The tracked pose of the object may include three dimensions of translation and three dimensions of rotation (i.e., six degrees of freedom (6 DoF)). The feature points of the object may be used by the visual tracker to calculate the tracked pose of the object in each frame, and the visual tracker may include optical flow tracking to track these feature points in the image frame sequence. The visual tracker may provide the tracked pose of the object for each frame to the annotation renderer.

The annotation renderer may augment the recognized object in the image frame and subsequent image frames with the annotation content received from the recognition proxy and provide the augmented image frame with the annotation to the display system 220 of the user computing device 102/200 for display on a display screen of the display system 220. The annotation renderer included in the application controller 204 or the augmented reality engine 304b may calculate a pose of the annotation for rendering and may include a three-dimensional graphics engine to render the annotation in a three-dimensional space to align the annotation content to the object in each frame according to the rendering instructions provided with the annotation content or rendering instructions included on the annotation renderer. The annotation renderer may also render the annotation content according to user inputs provided by the user of the user computing device 102a/200. For example, the user may provide touch inputs to a touchscreen display system and the annotation renderer may modify the annotation content according to those rendering instruction provided by the touch inputs.

The method 800 may then proceed to block 814 where additional media content associated with the location and the object in the physical environment may be received and where the additional media content may be associated with the virtual display and the data model. In an embodiment, at block 814, the augmented reality engine 304b may receive user instructions from the user of the user computing device 102a/200. In some embodiments, the user instructions may be to include annotation content or other media content that is gathered during an augmented reality session. For example, a user may request that annotation content that is associated with an object be added to the data model 310. For example, if the augmented reality profile is a global augmented reality profile that is updated by various user's, content provided by other users may be associated with a data model that is associated with a particular user. In another specific example, the data model for an object may include location information from where that object was purchased or otherwise acquired. The user may subsequently visit that location after creating data model. While using the augmented reality feature and discovering annotation content that is associated with the location, the user may want to update the data model with additional media content that includes the annotation data from the augmented reality profile. In addition, the user may attach one or more image frames or any video content obtained during the augmented reality session with the data model as additional media content.

In various embodiments, the user inputs may also be provided to the augmented reality engine 304b such that any changes to the annotation content associated with an augmented reality profile may update the annotation content 312b stored in that augmented reality profile 312. When the annotation content is associated with the media content included in the data model, then the media content may also be updated with the updated annotation content.

Thus, systems and methods of the present disclosure provide a data modeling system. The data modeling system provides improvements to content management, augmented reality improvements, or machine learning. The systems and methods may be used to generate a data model that may be transferable between users and that may include a plurality of media content that includes different types of media content. Current solutions fail to merge various media content to a single data model such that the media content provides important information about a virtual display that is associated with a physical or virtual object.

Figure 9:
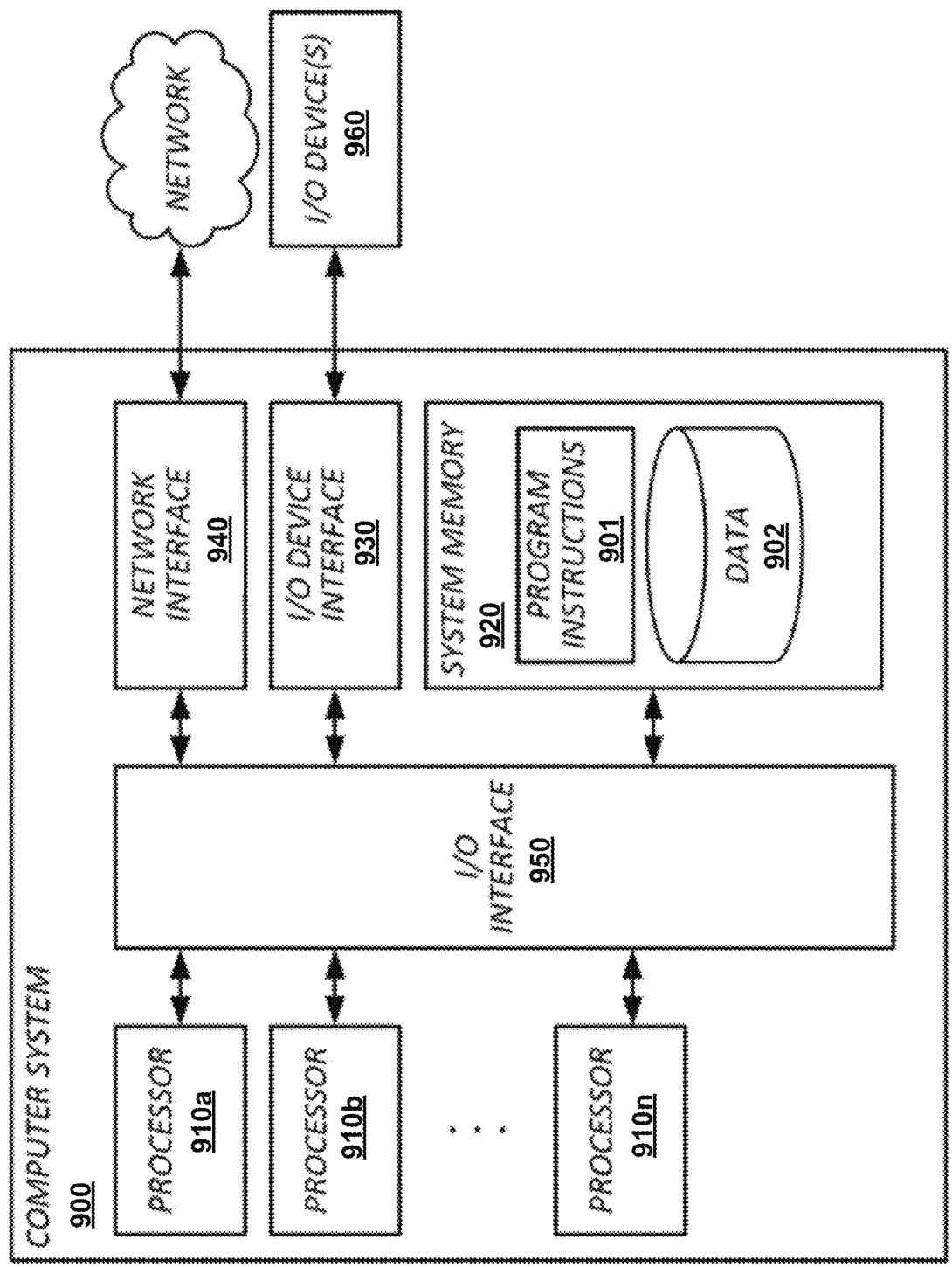
FIG. 9 is a block diagram of an example of a computing system with which the present techniques may be implemented, in accordance with some embodiments of the present disclosure.

FIG. 9 is a diagram that illustrates an exemplary computing system 900 in accordance with embodiments of the present technique. The user computing devices 102a, 102b, and 200 and the service provider computing devices 104 and 300, discussed above, may be provided by the computing system 900. Various portions of systems and methods described herein, may include or be executed on one or more computing systems similar to computing system 900. Further, processes and modules described herein may be executed by one or more processing systems similar to that of computing system 900.

Computing system 900 may include one or more processors (e.g., processors 910a-910n) coupled to system memory 920, an input/output I/O device interface 930, and a network interface 940 via an input/output (I/O) interface 950. A processor may include a single processor or a plurality of processors (e.g., distributed processors). A processor may be any suitable processor capable of executing or otherwise performing instructions. A processor may include a central processing unit (CPU) that carries out program instructions to perform the arithmetical, logical, and input/output operations of computing system 900. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 920). Computing system 900 may be a uni-processor system including one processor (e.g., processor 910*a*), or a multi-processor system including any number of suitable processors (e.g., 910*a*-910*n*). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, e.g., an FPGA (field programmable gate array) or an ASIC (application specific integrated circuit). Computing system 900 may include a plurality of computing devices (e.g., distributed computing systems) to implement various processing functions.

I/O device interface 930 may provide an interface for connection of one or more I/O devices 960 to computing system 900. I/O devices may include devices that receive input (e.g., from a user) or output information (e.g., to a user). I/O devices 960 may include, for example, graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 960 may be connected to computing system 900 through a wired or wireless connection. I/O devices 960 may be connected to computing system 900 from a remote location. I/O devices 960 located on remote computing system, for example, may be connected to computing system 900 via a network and network interface 940.

Network interface 940 may include a network adapter that provides for connection of computing system 900 to a network. Network interface 940 may facilitate data exchange between computing system 900 and other devices connected to the network. Network interface 940 may support wired or wireless communication. The network may include an electronic communication network, such as the Internet, a local area network (LAN), a wide area network (WAN), a cellular communications network, or the like.

System memory 920 may be configured to store program instructions 901 or data 902. Program instructions 901 may be executable by a processor (e.g., one or more of processors 910*a*-910*n*) to implement one or more embodiments of the present techniques. Instructions 901 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one or more computer processors located locally at one site or distributed across multiple remote sites and interconnected by a communication network.

System memory 920 may include a tangible program carrier having program instructions stored thereon. A tangible program carrier may include a non-transitory computer readable storage medium. A non-transitory computer readable storage medium may include a machine readable storage device, a machine readable storage substrate, a memory device, or any combination thereof. Non-transitory computer readable storage medium may include non-volatile memory (e.g., flash memory, ROM, PROM, EPROM, EEPROM memory), volatile memory (e.g., random access memory (RAM), static random access memory (SRAM), synchronous dynamic RAM (SDRAM)), bulk storage memory (e.g., CD-ROM or DVD-ROM, hard-drives), or the like. System memory 920 may include a non-transitory computer readable storage medium that may have program instructions stored thereon that are executable by a computer processor (e.g., one or more of processors 910*a*-910*n*) to cause the subject matter and the functional operations described herein. A memory (e.g., system memory 920) may include a single memory device or a plurality of memory devices (e.g., distributed memory devices). Instructions or other program code to provide the functionality described herein may be stored on a tangible, non-transitory computer readable media. In some cases, the entire set of instructions may be stored concurrently on the media, or in some cases, different parts of the instructions may be stored on the same media at different times.

I/O interface 950 may be configured to coordinate I/O traffic between processors 910*a*-1010*n*, system memory 920, network interface 940, I/O devices 960, or other peripheral devices. I/O interface 950 may perform protocol, timing, or other data transformations to convert data signals from one component (e.g., system memory 920) into a format suitable for use by another component (e.g., processors 910*a*-910*n*). I/O interface 950 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computing system 900 or multiple computing systems 900 configured to host different portions or instances of embodiments. Multiple computing systems 900 may provide for parallel or sequential processing/execution of one or more portions of the techniques described herein.

Those skilled in the art will appreciate that computing system 700 is merely illustrative and is not intended to limit the scope of the techniques described herein. Computing system 700 may include any combination of devices or software that may perform or otherwise provide for the performance of the techniques described herein. For example, computing system 700 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, or a Global Positioning System (GPS), or the like. Computing system 700 may also be connected to other devices that are not illustrated, or may operate as a stand-alone system. In addition, the functionality provided by the illustrated components may in some embodiments be combined in fewer components or distributed in additional components. Similarly, in some embodiments, the functionality of some of the illustrated components may not be provided or other additional functionality may be available.

Those skilled in the art will also appreciate that while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computing system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computing system 700 may be transmitted to computing system 700 via transmission media or signals such as electrical, electromagnetic, or digital signals, conveyed via a communication medium such as a network or a wireless link. Various embodiments may further include receiving, sending, or storing instructions or data implemented in accordance with the foregoing description upon a computer-accessible medium. Accordingly, the present techniques may be practiced with other computing system configurations.

In block diagrams, illustrated components are depicted as discrete functional blocks, but embodiments are not limited to systems in which the functionality described herein is organized as illustrated. The functionality provided by each of the components may be provided by software or hardware modules that are differently organized than is presently depicted, for example such software or hardware may be intermingled, conjoined, replicated, broken up, distributed (e.g. within a data center or geographically), or otherwise differently organized. The functionality described herein may be provided by one or more processors of one or more computers executing code stored on a tangible, non-transitory, machine readable medium. In some cases, notwithstanding use of the singular term "medium," the instructions may be distributed on different storage devices associated with different computing devices, for instance, with each computing device having a different subset of the instructions, an implementation consistent with usage of the singular term "medium" herein. In some cases, third party content delivery networks may host some or all of the information conveyed over networks, in which case, to the extent information (e.g., content) is said to be supplied or otherwise provided, the information may be provided by sending instructions to retrieve that information from a content delivery network.

The reader should appreciate that the present application describes several independently useful techniques. Rather than separating those techniques into multiple isolated patent applications, applicants have grouped these techniques into a single document because their related subject matter lends itself to economies in the application process. But the distinct advantages and aspects of such techniques should not be conflated. In some cases, embodiments address all of the deficiencies noted herein, but it should be understood that the techniques are independently useful, and some embodiments address only a subset of such problems or offer other, unmentioned benefits that will be apparent to those of skill in the art reviewing the present disclosure. Due to costs constraints, some techniques disclosed herein may not be presently claimed and may be claimed in later filings, such as continuation applications or by amending the present claims. Similarly, due to space constraints, neither the Abstract nor the Summary of the Invention sections of the present document should be taken as containing a comprehensive listing of all such techniques or all aspects of such techniques.

It should be understood that the description and the drawings are not intended to limit the present techniques to the particular form disclosed, but to the contrary, the intention is to cover all modifications, equivalents, and alternatives falling within the spirit and scope of the present techniques as defined by the appended claims. Further modifications and alternative embodiments of various aspects of the techniques will be apparent to those skilled in the art in view of this description. Accordingly, this description and the drawings are to be construed as illustrative only and are for the purpose of teaching those skilled in the art the general manner of carrying out the present techniques. It is to be understood that the forms of the present techniques shown and described herein are to be taken as examples of embodiments. Elements and materials may be substituted for those illustrated and described herein, parts and processes may be reversed or omitted, and certain features of the present techniques may be utilized independently, all as would be apparent to one skilled in the art after having the benefit of this description of the present techniques. Changes may be made in the elements described herein without departing from the spirit and scope of the present techniques as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y,", "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Statements in which a plurality of attributes or functions are mapped to a plurality of objects (e.g., one or more processors performing steps A, B, C, and D) encompasses both all such attributes or functions being mapped to all such objects and subsets of the attributes or functions being mapped to subsets of the attributes or functions (e.g., both all processors each performing steps A-D, and a case in which processor 1 performs step A, processor 2 performs step B and part of step C, and processor 3 performs part of step C and step D), unless otherwise indicated. Similarly, reference to "a computing system" performing step A and "the computing system" performing step B can include the same computing device within the computing system performing both steps or different computing devices within the computing system performing steps A and B. Further, unless otherwise indicated, statements that one value or action is "based on" another condition or value encompass both instances in which the condition or value is the sole factor and instances in which the condition or value is one factor among a plurality of factors. Unless otherwise indicated, statements that "each" instance of some collection have some property should not be read to exclude cases where some otherwise identical or similar members of a larger collection do not have the property, i.e., each does not necessarily mean each and every. Limitations as to sequence of recited steps should not be read into the claims unless explicitly specified, e.g., with explicit language like "after performing X, performing Y," in contrast to statements that might be improperly argued to imply sequence limitations, like "performing X on items, performing Y on the X'ed items," used for purposes of making claims more readable rather than specifying sequence. Statements referring to "at least Z of A, B, and C," and the like (e.g., "at least Z of A, B, or C"), refer to at least Z of the listed categories (A, B, and C) and do not require at least Z units in each category. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic processing/computing device. Features described with reference to geometric constructs, like "parallel," "perpendicular/orthogonal," "square", "cylindrical," and the like, should be construed as encompassing items that substantially embody the properties of the geometric construct, e.g., reference to "parallel" surfaces encompasses substantially parallel surfaces. The permitted range of deviation from Platonic ideals of these geometric constructs is to be determined with reference to ranges in the specification, and where such ranges are not stated, with reference to industry norms in the field of use, and where such ranges are not defined, with reference to industry norms in the field of manufacturing of the designated feature, and where such ranges are not defined, features substantially embodying a geometric construct should be construed to include those features within 15% of the defining attributes of that geometric construct. The terms "first", "second", "third," "given" and so on, if used in the claims, are used to distinguish or otherwise identify, and not to show a sequential or numerical limitation. As is the case in ordinary usage in the field, data structures and formats described with reference to uses salient to a human need not be presented in a human-intelligible format to constitute the described data structure or format, e.g., text need not be rendered or even encoded in Unicode or ASCII to constitute text; images, maps, and data-visualizations need not be displayed or decoded to constitute images, maps, and data-visualizations, respectively; speech, music, and other audio need not be emitted through a speaker or decoded to constitute speech, music, or other audio, respectively. Computer implemented instructions, commands, and the like are not limited to executable code and can be implemented in the form of data that causes functionality to be invoked, e.g., in the form of arguments of a function or API call. To the extent bespoke noun phrases (and other coined terms) are used in the claims and lack a self-evident construction, the definition of such phrases may be recited in the claim itself, in which case, the use of such bespoke noun phrases should not be taken as invitation to impart additional limitations by looking to the specification or extrinsic evidence.

In this patent, to the extent any U.S. patents, U.S. patent applications, or other materials (e.g., articles) have been incorporated by reference, the text of such materials is only incorporated by reference to the extent that no conflict exists between such material and the statements and drawings set forth herein. In the event of such conflict, the text of the present document governs, and terms in this document should not be given a narrower reading in virtue of the way in which those terms are used in other materials incorporated by reference.

The present techniques will be better understood with reference to the following enumerated embodiments:

1. A non-transitory, machine-readable medium storing instructions that, when executed by one or more processors, effectuate operations comprising: associating, by a computer system, a first virtual display of a first object with first media content including a first type media content; associating, by the computer system, the first virtual display of the object with second media content that includes second type media content; generating, by the computer system, a first data model that includes the first virtual display associated with the first media content and the second media content; and storing, by the computer system, the first data model in a storage device coupled to the computer system.

2. The medium of embodiment 1, wherein the first object is a physical object.

3. The medium of embodiment 2, wherein the first virtual display includes a three-dimensional virtual model of the physical object.

4. The medium of embodiment 1, wherein the operations further comprise: generating, by the computer system, the first virtual display of the object.

5. The medium of embodiment 1, wherein the association of the first virtual display with the first media content or the association of the first virtual display with the second media content is performed by associating each with a common identifier.

6. The medium of embodiment 1, wherein the operations further comprise: receiving, by the computer system, a request to view the first data model; and providing, by the computer system for output via a user input/output system, at least one of the first virtual display, the first media content, or the second media content.

7. The medium of embodiment 6, wherein the operations further comprise: generating, by the computer system, a quick response code that identifies an address to send the request, wherein the request is received in response to the quick response code being scanned.

8. The medium of embodiment 1, wherein the operations further comprise: receiving, by the computer system, a request to view the first data model; determining, by the computer system and from an identifier included in the request, that a user associated with the request does not have permissions to at least one of the first virtual display, the first media content, or the second media content; and providing, by the computer system for output via a user input/output system, any portion of the first data model for which the user has permission to consume while preventing the at least one of the first virtual display, the first media content, or the second media content from being consumed.

9. The medium of embodiment 1, wherein the operations further comprise: generating, by the computer system based on the first data model, a non-fungible token according to a non-fungible token standard.

10. The medium of embodiment 1, wherein the operations further comprise: generating, by the computer system, the first media content.

11. The medium of embodiment 1, wherein the generating the first media content includes: at least one of receiving content inputs from a user or receiving content inputs from a content generations algorithm that includes a machine learning algorithm that generates content from information obtained from the virtual display and the user.

12. The medium of embodiment 1, wherein the operations further comprise: computationally processing, by the computer system, a first image frame against a first augmented reality profile associated with the first data model, wherein the first augmented reality profile includes first annotation content associated with the first object; in response to an object computationally processed from the first image frame satisfying a predetermined threshold of similarity with the first object in the first augmented reality profile, correlating, by the computer system, the object as the first object; and causing, by the computer system, the first annotation content to be rendered relative to the first object according to rendering instructions for the first annotation content in a subsequent image frame.

13. The medium of embodiment 12, wherein the first image frame includes a compact feature representation of the first image frame and the determining the predetermined threshold of similarity includes comparing the compact feature representation of the first image frame to a compact feature representation of the first object.

14. The medium of embodiment 12, wherein the operations further comprise: receiving, by the computer system, location information associated with the first image frame; and determining, by the computer system, a set of augmented reality profiles associated with a location identified in the location information, wherein the first augmented reality profile is included in the set of augmented reality profiles.

15. The medium of embodiment 14, wherein the operations further comprise: receiving, by the computer system, third media content associated with the location and the object in the first image frame; associating, by the computer system, the third media content with the first virtual display and the first data model.

16. The medium of embodiment 12, wherein the first annotation content includes at least one of the first media content or the second media content.

17. The medium of embodiment 12, wherein the operations further comprise: modifying, by the computer system, the first annotation content to second annotation content based on received user input instruction; storing, by the computer system, the second annotation content in the first augmented reality profile; and providing, by the computer system, the second annotation content to any user device consuming the first annotation content.

18. The medium of embodiment 1, wherein the operations further comprise: detecting, by the computer system and using a machine learning algorithm, that one or more of the virtual display, the first media content, or the second media content violates a policy; and performing, by the computer system, a moderation action based on the policy violated.

19. The medium of embodiment 1, wherein the first media content or the second media content are obtained by performing a search of a database using information associated with the first object or a set of feature points generated from the virtual display.

20. A method comprising: associating, by a computer system, a first virtual display of a first object with first media content including a first type media content; associating, by the computer system, the first virtual display of the object with second media content that includes second type media content; generating, by the computer system, a first data model that includes the first virtual display associated with the first media content and the second media content; and storing, by the computer system, the first data model in a storage device coupled to the computer system.

What is claimed is:

1. A non-transitory, machine-readable medium storing instructions that, when executed by one or more processors, effectuate operations comprising:
obtaining, with a computer system, feature points of a virtual display of an object;
comparing, with the computer system, the feature points to feature points of objects in a database;
determining, with the computer system, that a similarity condition exists between the feature points of the virtual display of the object and feature points of a set of objects in the database;
providing, with the computer system and using a machine learning algorithm, a suggestion of information associated with a first portion of the set of objects to incorporate with a data model of the object while discarding information associated with a second portion of the set of objects;
generating, with the computer system, a data model that includes the virtual display and any user-approved information associated with the first portion of the set of objects; and
storing, with the computer system, the data model in a storage device coupled to the computer system.

2. The non-transitory, machine-readable medium of claim 1, wherein the suggestion of information is based on preferences of a user associated with the virtual display.

3. The non-transitory, machine-readable medium of claim 1, wherein the operations further comprise:
receiving, by the computer system, a selection of the suggestion of information to obtain the user-approved information; and
updating, by the computer system, the machine learning algorithm based on the user-approved information.

4. The non-transitory, machine-readable medium of claim 1, wherein the operations further comprise:
associating, by the computer system, the virtual display with first media content including a first type media content, wherein the data model that is generated includes the first media content.

5. The non-transitory, machine-readable medium of claim 1, wherein the machine learning algorithm includes an artificial neural network.

6. The non-transitory, machine-readable medium of claim 1, wherein the object is a physical object.

7. The non-transitory, machine-readable medium of claim 6, wherein the virtual display includes a three-dimensional virtual model of the physical object.

8. The non-transitory, machine-readable medium of claim 1, wherein the operations further comprise:
  generating, by the computer system, the virtual display of the object.

9. The non-transitory, machine-readable medium of claim 1, wherein the operations further comprise:
  receiving, by the computer system, a request to view the data model; and
  providing, by the computer system for output via a user input/output system, at least one of the virtual display or the user-approved information.

10. The non-transitory, machine-readable medium of claim 1, wherein the operations further comprise:
  receiving, by the computer system, a request to view the data model;
  determining, by the computer system and from an identifier included in the request, that a user associated with the request does not have permissions to at least one of the virtual display or the user-approved information; and
  providing, by the computer system for output via a user input/output system, any portion of the data model for which the user has permission to access while preventing the at least one of the virtual display or the user-approved information that the user does not have the permission to access.

11. The non-transitory, machine-readable medium of claim 1, wherein the operations further comprise:
  generating, by the computer system based on the data model, a non-fungible token according to a non-fungible token standard.

12. The non-transitory, machine-readable medium of claim 1, wherein the operations further comprise:
  generating, by the computer system, first media content that is associated with the data model.

13. The non-transitory, machine-readable medium of claim 12, wherein the generating the first media content includes:
  at least one of receiving content inputs from a user or receiving content inputs from a content generations algorithm that includes a machine learning algorithm that generates content from information obtained from the virtual display and the user.

14. The non-transitory, machine-readable medium of claim 1, wherein the operations further comprise:
  computationally processing, by the computer system, a first image frame against a first augmented reality profile associated with the data model, wherein the first augmented reality profile includes first annotation content associated with the object;
  in response to an object computationally processed from the first image frame satisfying a predetermined threshold of similarity with the object in the first augmented reality profile, correlating, by the computer system, the object as the object; and
  causing, by the computer system, the first annotation content to be rendered relative to the object according to rendering instructions for the first annotation content in a subsequent image frame.

15. The non-transitory, machine-readable medium of claim 14, wherein the first image frame includes a compact feature representation of the first image frame and the determining the predetermined threshold of similarity includes comparing the compact feature representation of the first image frame to a compact feature representation of the object.

16. The non-transitory, machine-readable medium of claim 14, wherein the operations further comprise:
  receiving, by the computer system, location information associated with the first image frame; and
  determining, by the computer system, a set of augmented reality profiles associated with a location identified in the location information, wherein the first augmented reality profile is included in the set of augmented reality profiles.

17. The medium of claim 14, wherein the first annotation content includes at least a portion of the user-approved information.

18. The non-transitory, machine-readable medium of claim 14, wherein the operations further comprise:
  modifying, by the computer system, the first annotation content to second annotation content based on received user input instruction;
  storing, by the computer system, the second annotation content in the first augmented reality profile; and
  providing, by the computer system, the second annotation content to any user device consuming the first annotation content.

19. The non-transitory, machine-readable medium of claim 1, wherein the operations further comprise step for:
  generating the data model.

20. A method, comprising:
  obtaining, with a computer system, feature points of a virtual display of an object;
  comparing, with the computer system, the feature points to feature points of objects in a database;
  determining, with the computer system, that a similarity condition exists between the feature points of the virtual display of the object and feature points of a set of objects in the database;
  providing, with the computer system and using a machine learning algorithm, a suggestion of information associated with a first portion of the set of objects to incorporate with a data model of the object while discarding information associated with a second portion of the set of objects;
  generating, with the computer system, a data model that includes the virtual display and any user-approved information associated with the first portion of the set of objects; and
  storing, with the computer system, the data model in a storage device coupled to the computer system.

\* \* \* \* \*